US008884926B1

(12) United States Patent
Eriksson et al.

(10) Patent No.: US 8,884,926 B1
(45) Date of Patent: Nov. 11, 2014

(54) LIGHT-BASED FINGER GESTURE USER INTERFACE

(71) Applicant: Neonode Inc., Santa Clara, CA (US)

(72) Inventors: Thomas Eriksson, Stockholm (SE); Per Leine, Täby (SE); Jochen Laveno Mangelsdorff, Stockholm (SE); Robert Pettersson, Huddinge (SE); Anders Jansson, Älta (SE); Magnus Goertz, Lidingo (SE)

(73) Assignee: Neonode Inc., Santa Clara, CA (US)

( * ) Notice: Subject to any disclaimer, the term of this patent is extended or adjusted under 35 U.S.C. 154(b) by 0 days.

(21) Appl. No.: 14/331,288

(22) Filed: Jul. 15, 2014

Related U.S. Application Data

(63) Continuation of application No. 13/854,074, filed on Mar. 30, 2013, now Pat. No. 8,810,551, which is a continuation of application No. 13/424,592, filed on Mar. 20, 2012, now Pat. No. 8,416,217, and a continuation-in-part of application No. 12/760,568, filed on Apr. 15, 2010, and a continuation-in-part of application No. 12/371,609, filed on Feb. 15, 2009, now Pat. No. 8,339,379, which is a continuation-in-part of application No. 10/494,055, filed as application No. PCT/SE02/02000 on Nov. 4, 2002, now Pat. No. 7,880,732.

(60) Provisional application No. 61/564,868, filed on Nov. 30, 2011, provisional application No. 61/169,779, filed on Apr. 16, 2009, provisional application No. 61/171,464, filed on Apr. 22, 2009, provisional application No. 61/317,255, filed on Mar. 24, 2010.

(51) Int. Cl.
*G06F 3/042* (2006.01)

(52) U.S. Cl.
CPC .................................. *G06F 3/0421* (2013.01)
USPC ........................................ 345/175; 178/18.09

(58) Field of Classification Search
USPC .................... 345/173–184; 178/18.01–20.04;
361/379.01–679.29
See application file for complete search history.

(56) References Cited

U.S. PATENT DOCUMENTS 4,144,449 A * 3/1979 Funk et al. ..................... 250/221
4,243,879 A   1/1981 Carroll et al.
(Continued)

FOREIGN PATENT DOCUMENTS

EP    0330767 A1    9/1989
EP    0516394 A2    11/1992
(Continued)

OTHER PUBLICATIONS

Moeller et al., "Scanning FTIR: Unobtrusive Optoelectronic Multi-Touch Sensing through Waveguide Transmissivity Imaging",TEI '10, Proceedings of the Fourth International Conference on Tangible, Embedded, and Embodied Interaction, pp. 73-76, ACM, New York, NY, Jan. 25-27, 2010.

(Continued)

*Primary Examiner* — Liliana Cerullo
(74) *Attorney, Agent, or Firm* — Soquel Group LLC

(57) ABSTRACT

A finger gesture user interface for an electronic device, including a housing for an electronic device including a front opening in a front outer surface of the housing, a rear opening in a rear outer surface of the housing, and inner sidewalls extending from the front opening to the rear opening to form a cavity, a display, mounted in the housing along a plane transverse to the front and rear openings, for rendering a 3D realm, a detector mounted in the inner sidewalls, operable to detect translation of a finger inserted in the cavity along a dimension of the cavity transverse to the display plane, and a processor connected to the detector and to the display for interpreting the detected finger translation as a user interface input command to move within the 3D realm along the dimension transverse to the display.

11 Claims, 37 Drawing Sheets

(56) References Cited

U.S. PATENT DOCUMENTS

| | | |
|---|---|---|
| 4,301,447 A | 11/1981 | Funk et al. |
| 4,518,249 A | 5/1985 | Murata et al. |
| 4,550,250 A | 10/1985 | Mueller et al. |
| 4,703,316 A | 10/1987 | Sherbeck |
| 4,710,760 A | 12/1987 | Kasday |
| 4,782,328 A | 11/1988 | Denlinger |
| 4,790,028 A | 12/1988 | Ramage |
| 4,847,606 A | 7/1989 | Beiswenger |
| 4,880,969 A | 11/1989 | Lawrie |
| 4,928,094 A | 5/1990 | Smith |
| 5,003,505 A | 3/1991 | McClelland |
| 5,016,008 A | 5/1991 | Gruaz et al. |
| 5,036,187 A | 7/1991 | Yoshida et al. |
| 5,053,758 A | 10/1991 | Cornett et al. |
| 5,119,079 A | 6/1992 | Hube et al. |
| 5,162,783 A | 11/1992 | Moreno |
| 5,179,369 A | 1/1993 | Person et al. |
| 5,194,863 A | 3/1993 | Barker et al. |
| 5,220,409 A | 6/1993 | Bures |
| 5,283,558 A | 2/1994 | Chan |
| 5,406,307 A | 4/1995 | Hirayama et al. |
| 5,414,413 A | 5/1995 | Tamaru et al. |
| 5,422,494 A | 6/1995 | West et al. |
| 5,463,725 A | 10/1995 | Henckel et al. |
| 5,559,727 A | 9/1996 | Deley et al. |
| 5,577,733 A | 11/1996 | Downing |
| 5,579,035 A | 11/1996 | Beiswenger |
| 5,603,053 A | 2/1997 | Gough et al. |
| 5,612,719 A | 3/1997 | Beernink et al. |
| 5,618,232 A | 4/1997 | Martin |
| 5,729,250 A | 3/1998 | Bishop et al. |
| 5,748,185 A | 5/1998 | Stephan et al. |
| 5,785,439 A | 7/1998 | Bowen |
| 5,825,352 A | 10/1998 | Bisset et al. |
| 5,838,308 A | 11/1998 | Knapp et al. |
| 5,880,743 A | 3/1999 | Moran et al. |
| 5,886,697 A | 3/1999 | Naughton et al. |
| 5,889,236 A | 3/1999 | Gillespie et al. |
| 5,900,875 A | 5/1999 | Haitani et al. |
| 5,914,709 A | 6/1999 | Graham et al. |
| 5,936,615 A | 8/1999 | Waters |
| 5,943,043 A | 8/1999 | Furuhata et al. |
| 5,943,044 A | 8/1999 | Martinelli et al. |
| 5,956,030 A | 9/1999 | Conrad et al. |
| 5,988,645 A | 11/1999 | Downing |
| 6,010,061 A | 1/2000 | Howell |
| 6,023,265 A | 2/2000 | Lee |
| 6,031,989 A | 2/2000 | Cordell |
| 6,052,279 A | 4/2000 | Friend et al. |
| 6,073,036 A | 6/2000 | Heikkinen et al. |
| 6,085,204 A | 7/2000 | Chijiwa et al. |
| 6,091,405 A | 7/2000 | Lowe et al. |
| 6,246,395 B1 | 6/2001 | Goyins et al. |
| 6,259,436 B1 | 7/2001 | Moon et al. |
| 6,292,179 B1 | 9/2001 | Lee |
| 6,323,846 B1 | 11/2001 | Westerman et al. |
| 6,340,979 B1 | 1/2002 | Beaton et al. |
| 6,346,935 B1 | 2/2002 | Nakajima et al. |
| 6,356,287 B1 | 3/2002 | Ruberry et al. |
| 6,359,632 B1 | 3/2002 | Eastty et al. |
| 6,362,468 B1 | 3/2002 | Murakami et al. |
| 6,411,283 B1 | 6/2002 | Murphy |
| 6,421,042 B1 | 7/2002 | Omura et al. |
| 6,429,857 B1 | 8/2002 | Masters et al. |
| 6,456,952 B1 | 9/2002 | Nathan |
| 6,529,920 B1 | 3/2003 | Arons et al. |
| 6,542,191 B1 | 4/2003 | Yonezawa |
| 6,549,217 B1 | 4/2003 | De Greef et al. |
| 6,570,557 B1 | 5/2003 | Westerman et al. |
| 6,597,345 B2 | 7/2003 | Hirshberg |
| 6,628,268 B1 | 9/2003 | Harada et al. |
| 6,639,584 B1 | 10/2003 | Li |
| 6,646,633 B1 | 11/2003 | Nicolas |
| 6,677,932 B1 | 1/2004 | Westerman |
| 6,690,365 B2 | 2/2004 | Hinckley et al. |
| 6,690,387 B2 | 2/2004 | Zimmerman et al. |
| 6,707,449 B2 | 3/2004 | Hinckley et al. |
| 6,727,917 B1 | 4/2004 | Chew et al. |
| 6,734,883 B1 | 5/2004 | Wynn et al. |
| 6,757,002 B1 | 6/2004 | Oross et al. |
| 6,788,292 B1 | 9/2004 | Nako et al. |
| 6,803,906 B1 | 10/2004 | Morrison et al. |
| 6,833,827 B2 | 12/2004 | Lui et al. |
| 6,836,367 B2 | 12/2004 | Seino et al. |
| 6,857,746 B2 | 2/2005 | Dyner |
| 6,864,882 B2 | 3/2005 | Newton |
| 6,874,683 B2 | 4/2005 | Keronen et al. |
| 6,888,536 B2 | 5/2005 | Westerman et al. |
| 6,944,557 B2 | 9/2005 | Hama et al. |
| 6,947,032 B2 | 9/2005 | Morrison et al. |
| 6,954,197 B2 | 10/2005 | Morrison et al. |
| 6,958,749 B1 | 10/2005 | Matsushita et al. |
| 6,972,401 B2 | 12/2005 | Akitt et al. |
| 6,988,246 B2 | 1/2006 | Kopitzke et al. |
| 6,992,660 B2 | 1/2006 | Kawano et al. |
| 7,006,077 B1 | 2/2006 | Uusimaki |
| 7,007,239 B1 | 2/2006 | Hawkins et al. |
| 7,030,861 B1 | 4/2006 | Westerman et al. |
| 7,133,032 B2 | 11/2006 | Cok |
| 7,155,683 B1 | 12/2006 | Williams |
| 7,159,763 B2 | 1/2007 | Yap et al. |
| 7,176,905 B2 | 2/2007 | Baharav et al. |
| 7,184,030 B2 | 2/2007 | McCharles et al. |
| 7,225,408 B2 | 5/2007 | O'Rourke |
| 7,232,986 B2 | 6/2007 | Worthington et al. |
| 7,254,775 B2 | 8/2007 | Geaghan et al. |
| 7,265,748 B2 | 9/2007 | Ryynanen |
| 7,283,845 B2 | 10/2007 | De Bast |
| 7,286,063 B2 | 10/2007 | Gauthey et al. |
| RE40,153 E | 3/2008 | Westerman et al. |
| 7,339,580 B2 | 3/2008 | Westerman et al. |
| 7,352,940 B2 | 4/2008 | Charters et al. |
| 7,355,594 B2 | 4/2008 | Barkan |
| 7,369,724 B2 | 5/2008 | Deane |
| 7,372,456 B2 | 5/2008 | McLintock |
| 7,429,706 B2 | 9/2008 | Ho |
| 7,435,940 B2 | 10/2008 | Eliasson et al. |
| 7,441,196 B2 | 10/2008 | Gottfurcht et al. |
| 7,442,914 B2 | 10/2008 | Eliasson et al. |
| 7,464,110 B2 | 12/2008 | Pyhalammi et al. |
| 7,465,914 B2 | 12/2008 | Eliasson et al. |
| 7,469,381 B2 | 12/2008 | Ording |
| 7,479,949 B2 | 1/2009 | Jobs et al. |
| 7,633,300 B2 | 12/2009 | Keroe et al. |
| 7,663,607 B2 | 2/2010 | Hotelling et al. |
| 7,705,835 B2 | 4/2010 | Eikman |
| 7,742,290 B1 | 6/2010 | Kaya |
| 7,782,296 B2 | 8/2010 | Kong et al. |
| 7,812,828 B2 | 10/2010 | Westerman et al. |
| 7,855,716 B2 | 12/2010 | McCreary et al. |
| 7,880,724 B2 | 2/2011 | Nguyen et al. |
| 7,880,732 B2 | 2/2011 | Goertz |
| 7,961,176 B2 | 6/2011 | Moon |
| 8,022,941 B2 | 9/2011 | Smoot |
| 8,068,101 B2 | 11/2011 | Goertz |
| 8,095,879 B2 | 1/2012 | Goertz |
| 8,120,625 B2 | 2/2012 | Hinckley |
| 8,169,404 B1 * | 5/2012 | Boillot .................... 345/158 |
| 8,416,217 B1 | 4/2013 | Eriksson et al. |
| 2001/0002694 A1 | 6/2001 | Nakazawa et al. |
| 2001/0022579 A1 | 9/2001 | Hirabayashi |
| 2001/0026268 A1 | 10/2001 | Ito |
| 2001/0028344 A1 | 10/2001 | Iwamoto et al. |
| 2001/0030641 A1 | 10/2001 | Suzuki |
| 2001/0043189 A1 | 11/2001 | Brisebois et al. |
| 2001/0055006 A1 | 12/2001 | Sano et al. |
| 2002/0002326 A1 | 1/2002 | Causey, III et al. |
| 2002/0027549 A1 | 3/2002 | Hirshberg |
| 2002/0046353 A1 | 4/2002 | Kishimoto |
| 2002/0060699 A1 | 5/2002 | D'Agostini |
| 2002/0067346 A1 | 6/2002 | Mouton |
| 2002/0075244 A1 | 6/2002 | Tani et al. |
| 2002/0109843 A1 | 8/2002 | Ehsani et al. |
| 2002/0171691 A1 | 11/2002 | Currans et al. |

(56) References Cited

U.S. PATENT DOCUMENTS

| | | |
|---|---|---|
| 2002/0173300 A1 | 11/2002 | Shtivelman et al. |
| 2002/0175900 A1 | 11/2002 | Armstrong |
| 2002/0191029 A1 | 12/2002 | Gillespie et al. |
| 2003/0002809 A1 | 1/2003 | Jian |
| 2003/0010043 A1 | 1/2003 | Ferragut, II |
| 2003/0013483 A1 | 1/2003 | Ausems et al. |
| 2003/0030656 A1 | 2/2003 | Ang et al. |
| 2003/0043207 A1 | 3/2003 | Duarte |
| 2003/0076306 A1 | 4/2003 | Zadesky et al. |
| 2003/0095102 A1 | 5/2003 | Kraft et al. |
| 2003/0122787 A1 | 7/2003 | Zimmerman et al. |
| 2003/0234346 A1 | 12/2003 | Kao |
| 2004/0021643 A1 | 2/2004 | Hoshino et al. |
| 2004/0021681 A1 | 2/2004 | Liao |
| 2004/0046960 A1 | 3/2004 | Wagner et al. |
| 2004/0056199 A1 | 3/2004 | O'Connor et al. |
| 2004/0100510 A1 | 5/2004 | Milic-Frayling et al. |
| 2004/0109013 A1 | 6/2004 | Goertz |
| 2004/0125143 A1 | 7/2004 | Deaton et al. |
| 2004/0263482 A1 | 12/2004 | Goertz |
| 2005/0035956 A1 | 2/2005 | Sinclair et al. |
| 2005/0046621 A1 | 3/2005 | Kaikuranta |
| 2005/0091612 A1 | 4/2005 | Stabb et al. |
| 2005/0104860 A1 | 5/2005 | McCreary et al. |
| 2005/0122308 A1 | 6/2005 | Bell et al. |
| 2005/0165615 A1 | 7/2005 | Minar |
| 2005/0174473 A1 | 8/2005 | Morgan et al. |
| 2005/0253818 A1 | 11/2005 | Nettamo |
| 2005/0271319 A1 | 12/2005 | Graham |
| 2006/0001654 A1 | 1/2006 | Smits |
| 2006/0161870 A1 | 7/2006 | Hotelling et al. |
| 2006/0161871 A1 | 7/2006 | Hotelling et al. |
| 2006/0229509 A1 | 10/2006 | Al-Ali et al. |
| 2007/0024598 A1 | 2/2007 | Miller et al. |
| 2007/0082707 A1 | 4/2007 | Flynt et al. |
| 2007/0084989 A1 | 4/2007 | Lange et al. |
| 2007/0146318 A1 | 6/2007 | Juh et al. |
| 2007/0150842 A1 | 6/2007 | Chaudhri et al. |
| 2007/0152984 A1 | 7/2007 | Ording et al. |
| 2007/0223792 A1 | 9/2007 | Morimoto et al. |
| 2008/0008472 A1 | 1/2008 | Dress et al. |
| 2008/0012850 A1 | 1/2008 | Keating, III |
| 2008/0013913 A1 | 1/2008 | Lieberman et al. |
| 2008/0055273 A1 | 3/2008 | Forstall |
| 2008/0068353 A1 | 3/2008 | Lieberman et al. |
| 2008/0086703 A1 | 4/2008 | Flynt et al. |
| 2008/0093542 A1 | 4/2008 | Lieberman et al. |
| 2008/0100593 A1 | 5/2008 | Skillman et al. |
| 2008/0111797 A1 | 5/2008 | Lee |
| 2008/0117176 A1 | 5/2008 | Ko et al. |
| 2008/0117183 A1 | 5/2008 | Yu et al. |
| 2008/0121442 A1 | 5/2008 | Boer et al. |
| 2008/0122792 A1 | 5/2008 | Izadi et al. |
| 2008/0122796 A1 | 5/2008 | Jobs et al. |
| 2008/0122803 A1 | 5/2008 | Izadi et al. |
| 2008/0136790 A1 | 6/2008 | Hio |
| 2008/0152195 A1 | 6/2008 | Nagasaka et al. |
| 2008/0158174 A1 | 7/2008 | Land et al. |
| 2008/0165190 A1 | 7/2008 | Min et al. |
| 2008/0168404 A1 | 7/2008 | Ording |
| 2008/0192025 A1 | 8/2008 | Jaeger et al. |
| 2008/0211779 A1 | 9/2008 | Pryor |
| 2008/0259053 A1 | 10/2008 | Newton |
| 2008/0273019 A1 | 11/2008 | Deane |
| 2008/0297409 A1 | 12/2008 | Klassen et al. |
| 2008/0297487 A1 | 12/2008 | Hotelling et al. |
| 2009/0006418 A1 | 1/2009 | O'Malley |
| 2009/0027357 A1 | 1/2009 | Morrison |
| 2009/0031208 A1 | 1/2009 | Robinson |
| 2009/0058833 A1 | 3/2009 | Newton |
| 2009/0064055 A1 | 3/2009 | Chaudhri et al. |
| 2009/0066673 A1 | 3/2009 | Molne et al. |
| 2009/0096994 A1 | 4/2009 | Smits |
| 2009/0139778 A1 | 6/2009 | Butler et al. |
| 2009/0143052 A1 | 6/2009 | Bates et al. |
| 2009/0166098 A1 | 7/2009 | Sunder |
| 2009/0187840 A1 | 7/2009 | Moosavi |
| 2009/0189878 A1 | 7/2009 | Goertz et al. |
| 2009/0192849 A1 | 7/2009 | Hughes et al. |
| 2009/0256809 A1* | 10/2009 | Minor ......................... 345/173 |
| 2009/0285383 A1 | 11/2009 | Tsuei |
| 2009/0322699 A1 | 12/2009 | Hansson |
| 2009/0322701 A1 | 12/2009 | D'Souza et al. |
| 2010/0017872 A1 | 1/2010 | Goertz et al. |
| 2010/0031203 A1 | 2/2010 | Morris et al. |
| 2010/0053111 A1 | 3/2010 | Karlsson |
| 2010/0134424 A1 | 6/2010 | Brisebois et al. |
| 2010/0193259 A1 | 8/2010 | Wassvik |
| 2010/0238138 A1 | 9/2010 | Goertz et al. |
| 2010/0238139 A1 | 9/2010 | Goertz et al. |
| 2010/0283747 A1 | 11/2010 | Kukulski |
| 2011/0007032 A1 | 1/2011 | Goertz |
| 2011/0043485 A1 | 2/2011 | Goertz |
| 2011/0043826 A1 | 2/2011 | Kiyose |
| 2011/0087963 A1 | 4/2011 | Brisebois et al. |
| 2011/0128234 A1 | 6/2011 | Lipman et al. |
| 2011/0134064 A1 | 6/2011 | Goertz |
| 2011/0154260 A1 | 6/2011 | Wang et al. |
| 2011/0161843 A1 | 6/2011 | Bennett et al. |
| 2011/0163971 A1 | 7/2011 | Wagner et al. |
| 2011/0163998 A1 | 7/2011 | Goertz et al. |
| 2011/0167628 A1 | 7/2011 | Goertz et al. |
| 2011/0169780 A1 | 7/2011 | Goertz et al. |
| 2011/0169781 A1 | 7/2011 | Goertz et al. |
| 2011/0169782 A1 | 7/2011 | Goertz et al. |
| 2011/0175852 A1 | 7/2011 | Goertz et al. |
| 2011/0179368 A1 | 7/2011 | King et al. |
| 2011/0181552 A1 | 7/2011 | Goertz et al. |
| 2011/0210946 A1 | 9/2011 | Goertz et al. |
| 2011/0239155 A1 | 9/2011 | Christie |
| 2011/0246923 A1 | 10/2011 | Kasahara et al. |
| 2011/0260980 A1 | 10/2011 | Palacios |
| 2011/0310005 A1 | 12/2011 | Chen et al. |
| 2012/0081299 A1 | 4/2012 | Xiao et al. |
| 2012/0094723 A1 | 4/2012 | Goertz |
| 2012/0242620 A1 | 9/2012 | Bos |

FOREIGN PATENT DOCUMENTS

| | | |
|---|---|---|
| EP | 0601651 A1 | 6/1994 |
| EP | 0618528 A1 | 10/1994 |
| EP | 0703525 A1 | 3/1996 |
| EP | 1059603 A2 | 12/2000 |
| JP | 03-216719 A1 | 9/1991 |
| JP | 5173699 A | 12/1991 |
| JP | 11232024 A | 8/1999 |
| JP | 2003-296151 A | 10/2003 |
| JP | 2004-127072 A | 4/2004 |
| JP | 2004-185258 A | 7/2004 |
| WO | 8600446 A1 | 1/1986 |
| WO | 8600447 A1 | 1/1986 |
| WO | 0102949 A1 | 1/2001 |
| WO | 0140922 A2 | 6/2001 |
| WO | 02095668 A1 | 11/2002 |
| WO | 03038592 A1 | 5/2003 |
| WO | 03083767 A2 | 10/2003 |
| WO | 2005026938 A2 | 3/2005 |
| WO | 2008147266 A1 | 12/2008 |
| WO | 2009008786 A1 | 1/2009 |
| WO | 2010093570 A1 | 8/2010 |
| WO | 2010121031 A1 | 10/2010 |

OTHER PUBLICATIONS

Moeller et al., IntangibleCanvas: Free-Air Finger Painting on a Projected Canvas, CHI EA '11 Extended Abstracts, Proceedings of the 2011 Annual Conference on Human Factors in Computing Systems, pp. 1615-1620, ACM, New York, May 7-12, 2011.

(56) References Cited

OTHER PUBLICATIONS

Moeller et al., "ZeroTouch: A Zero-Thickness Optical Multi-Touch Force Field", CHI EA '11 Extended Abstracts, Proceedings of the 2011 Annual Conference on Human Factors in Computing Systems, pp. 1165-1170. ACM, New York, NY, May 7-12, 2011.

Myers et al., "Two-Handed Input Using a PDA and a Mouse", CHI '2000, CHI Letters, vol. 2 Issue 1, pp. 41-48, ACM, New York, NY, 2000.

Myers, "Using Handhelds and PCs Together," Communications of the ACM, vol. 44, No. 11, pp. 34-41, ACM New York, NY, Nov. 2001.

Myers, "Mobile Devices for Control", Mobile HCI 2002, LNCS 2411, pp. 1-8, Springer-Verlag, Berlin Heidelberg, 2002.

* cited by examiner

LIGHT-BASED FINGER GESTURE USER INTERFACE

CROSS REFERENCES TO RELATED APPLICATIONS

This application is a continuation of U.S. patent application Ser. No. 13/854,074, entitled LIGHT-BASED FINGER GESTURE USER INTERFACE and filed on Mar. 30, 2013 by inventors Thomas Eriksson, Per Leine, Jochen Laveno Mangelsdorff, Robert Pettersson, Anders Jansson and Magnus Goertz. U.S. patent application Ser. No. 13/854,074 is a continuation of U.S. patent application Ser. No. 13/424,592, now U.S. Pat. No. 8,416,217, entitled LIGHT-BASED FINGER GESTURE USER INTERFACE and filed on Mar. 20, 2012 by inventors Thomas Eriksson, Per Leine, Jochen Laveno Mangelsdorff, Robert Pettersson, Anders Jansson and Magnus Goertz. U.S. patent application Ser. No. 13/424,592 claims priority benefit of U.S. Provisional Patent Application No. 61/564,868, entitled LIGHT-BASED FINGER GESTURE USER INTERFACE, filed on Nov. 30, 2011 by inventors Thomas Eriksson, Per Leine, Jochen Laveno Mangelsdorff, Robert Pettersson and Anders Jansson. U.S. patent application Ser. No. 13/424,592 is a continuation-in-part of U.S. patent application Ser. No. 12/760,568, entitled OPTICAL TOUCH SCREEN SYSTEMS USING WIDE LIGHT BEAMS and filed on Apr. 15, 2010 by inventors Magnus Goertz, Thomas Eriksson and Joseph Shain. U.S. patent application Ser. No. 12/760,568 claims priority benefit of (i) U.S. Provisional Patent Application No. 61/169,779, entitled OPTICAL TOUCH SCREEN and filed on Apr. 16, 2009 by inventors Magnus Goertz, Thomas Eriksson and Joseph Shain; (ii) U.S. Provisional Patent Application No. 61/171,464, entitled TOUCH SCREEN USER INTERFACE and filed on Apr. 22, 2009 by inventor Magnus Goertz; and (iii) U.S. Provisional Patent Application No. 61/317,255, entitled OPTICAL TOUCH SCREEN WITH WIDE BEAM TRANSMITTERS AND RECEIVERS and filed on Mar. 24, 2010 by inventor Magnus Goertz. U.S. patent application Ser. No. 12/760,568 is a continuation-in-part of U.S. patent application Ser. No. 12/371,609, now U.S. Pat. No. 8,339,379, entitled LIGHT-BASED TOUCH SCREEN and filed on Feb. 15, 2009 by inventors Magnus Goertz, Thomas Eriksson and Joseph Shain. U.S. patent application Ser. No. 12/371,609 is a continuation-in-part of U.S. patent application Ser. No. 10/494,055, now U.S. Pat. No. 7,880,732, entitled TOUCH SCREEN FOR MOBILE TELEPHONE and filed on Apr. 29, 2004 by inventor Magnus Goertz. U.S. patent application Ser. No. 10/494,055 is a 371 national phase of PCT/SE02/02000, entitled ON A SUBSTRATE FORMED OR RESTING DISPLAY ARRANGEMENT and filed on Nov. 4, 2002 by inventor Magnus Goertz.

FIELD OF THE INVENTION

The field of the present invention is touch-sensitive screens.

BACKGROUND OF THE INVENTION

Many consumer electronic devices are now being built with touch sensitive screens, for use with finger or stylus touch user inputs. These devices range from small screen devices such as mobile phones and car entertainment systems, to mid-size screen devices such as notebook computers, to large screen devices such as check-in stations at airports.

User input to a touch sensitive screen has evolved from basic screen taps to sweep gestures and to more elaborate pinch gestures involving coordinated, simultaneous input from two or more fingers. One of the drawbacks of touch screen input is that the user's hand blocks the user's view of the screen. This is especially true with two-finger pinch gestures where the two fingers span a screen diagonal.

It will thus be appreciated that conventional touch screens are not ideal for finger gesture input. It would be beneficial to provide an economic and aesthetic touch screen device that provides an input zone for finger gesture input that does not obstruct view of the screen.

SUMMARY OF THE DESCRIPTION

Aspects of the present invention provide a light-based user interface that detects and identifies finger gestures within a hollow cavity or a recessed cavity of an electronic device. The finger gestures may be one-finger gestures, such as sliding of a finger, or multi-finger gestures, such as a two-finger rotation, a two-finger pinch or a two-finger spread.

Further aspects of the present invention provide a light-based user interface that detects position and orientation of an object inserted within a three-dimensional cavity space, which has application to three-dimensional touch recognition and to three-dimensional modeling.

There is thus provided in accordance with an embodiment of the present invention a light-based finger gesture user interface for an electronic device including a housing for an electronic device, a display mounted in the housing, a cavity, separated from the display, penetrating two opposite sides of the housing, a detector mounted in the housing operative to detect an object inserted in the cavity, and a processor connected to the detector and to the display for causing the display to render a visual representation in response to output from the detector.

There is additionally provided in accordance with an embodiment of the present invention a light-based finger gesture user interface for an electronic device including a housing for an electronic device, a display mounted in the housing for rendering output generated by an application program, a cavity, separated from the display, penetrating two opposite sides of the housing, a sensor mounted in the housing operative to detect an object inserted in the cavity, and a processor in the housing connected to the display and to the sensor, for executing the application program, for receiving output of the sensor, and for providing input to the application program based on at least one of five location and orientation attributes of the object inserted inside the cavity: location along an x-axis, location along a y-axis, location along a z-axis, polar angle in the xy-plane, and polar angle in the yz-plane.

There is further provided in accordance with an embodiment of the present invention a three-dimensional modeling system including a handheld housing, a display mounted in the housing, a cavity, separated from the display, penetrating the housing, a plurality of emitters mounted in the housing that emit light pulses into the cavity, a plurality of receivers mounted in the housing that detect the light pulses, and a calculating unit, mounted in the housing and connected to the receivers and to the display, for determining contours of an object inserted in the cavity along two dimensions based on outputs of the receivers, wherein the calculating unit executes a series of such determinations over a time interval, during which time interval the object inserted in the cavity is translated along a plane normal to the cavity to generate a series of two-dimensional scans of contiguous sections of the object, and wherein the calculating unit assembles therefrom a three-dimensional model of the object and causes the display to render the model.

There is additionally provided in accordance with an embodiment of the present invention an electronic device including a light-based touch screen display and a cavity, separated from the display, penetrating two opposite sides of the housing, for providing light-based detection of user gestures performed in the cavity. Both the light-based touch screen display and the finger-gesture cavity are surrounded by pluralities of emitters and receivers mounted in the housing operative to detect objects touching the screen or inserted in the cavity, respectively. A controller in the housing is connected to both sets of emitters and receivers, for executing scan sequences thereon, and a processor is provided in the housing to receive the respective detection signals and determine the location of one or more touches on the screen and also to determine a user gesture of an object inserted inside the cavity.

BRIEF DESCRIPTION OF THE DRAWINGS

The present invention will be more fully understood and appreciated from the following detailed description, taken in conjunction with the drawings in which.

DETAILED DESCRIPTION

Figure 1:
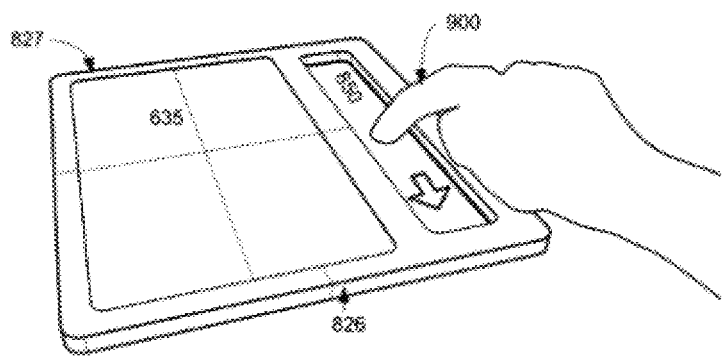
FIG. 1 is a simplified illustration of a device having a cavity for finger gesture user input that uses light-based detection, and a finger performing a translation gesture therein, in accordance with an embodiment of the present invention.

Aspects of the present invention relate to user input to electronic devices, and in particular, to a hollow cavity or a recessed cavity provided in a device housing separate from the device display operable to detect user input gestures performed in the cavity. The input gestures may be one-finger gestures, such as sliding a finger, or multi-finger gestures, such as a two-finger rotation, a two-finger pinch or a two-finger spread. The present invention further provides a light-based user interface that detects position and orientation of an object inserted within the cavity, which has application to three-dimensional touch recognition and to three-dimensional modeling, as described hereinbelow. The invention is described with regard to light based detection apparatus but other detection methods, such as acoustic methods, are also within the scope of the invention.

For clarity of exposition, throughout the present specification, the term "emitter" is used as a generic term to refer to a light emitting element, including inter alia a light-emitting diode (LED), and the output end of a fiber optic or tubular light guide that outputs light into a lens or reflector that directs the light over a display surface or into a cavity. The term "receiver" is used as a generic term to refer to a light detecting element, including inter alia a photo diode (PD), and the input end of a fiber optic or tubular light guide that receives light beams that traversed a display surface or cavity and directs them to a light detecting element or to an image sensor, the image sensor being inter alia a charge coupled device (CCD) or a complementary metal oxide semiconductor (CMOS) image sensor.

According to embodiments of the present invention, a subsystem is provided as a complement to a touch screen display, providing new types of user interaction, as well as many functionalities provided by a mouse input device but absent in finger-based touch screens. Physically, the device contains a display with a touch sensor combined with a fixed or foldable complementary optical sensor that allows items to be tracked inside an open frame. The open frame may be integrated into the device in a fixed manner, or as a foldable frame.

Prior art display touch sensors provide 2+1 input dimensions, i.e., X, Y and Z, where Z is typically only a binary dimension to distinguish touch from non-touch, although limited continuous dimension sensing is technically possible. Using a Z dimension on a touch screen has a disadvantage in that the further away from the XY plane the finger is located, the more of the display image is covered from visibility, due to the parallax effect between the eye and the display.

When combined with the user input cavity of the present invention, a touch screen is used for item selection, in a manner similar to ordinary user interface (UI) solutions. The user input cavity subsystem of the present invention provides extra dimensions of user input for context interaction with the item selected on the touch screen. One such interaction is an object selected on the touch display with one hand, and then changed in appearance though the user input cavity with the other hand. This combination provides a unique user input experience and makes user interaction more efficient. It also enables restoring mouse input functions by mimicking scroll wheel functions, right- or middle-button clicks, as well as combined control-button and clicks.

According to embodiments of the present invention, a user input cavity for detecting user gestures is provided in a device housing separate from the device display. Reference is made to FIG. 1, which is a simplified illustration of a device having a cavity for finger gesture user input that uses light-based detection, and a finger performing a translation gesture therein, in accordance with an embodiment of the present invention. FIG. 1 shows an electronic device 826 having a display 635 and a hollow user interface cavity 850 contained in a housing 827. Cavity 850 penetrates two opposite sides of housing 827. A finger 900 is shown performing a translation gesture—sliding along the length of cavity 850, as indicated by the arrow inside cavity 850.

Figure 2:
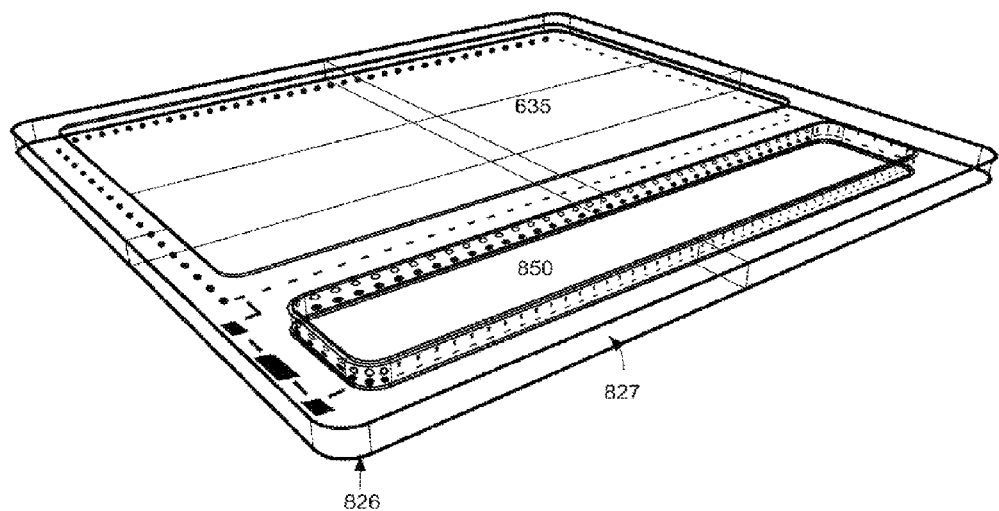
FIG. 2 is a simplified illustration of a device having a touch screen display and a cavity for finger gesture user input separate from the display, both of which use light-based detection, in accordance with an embodiment of the present invention.

Cavity 850 includes one or more emitters, including inter alia infra-red or near infra-red light-emitting diodes (LEDs), and a plurality of receivers, including inter alia photo diodes (PDs), arranged along the cavity perimeter. Reference is made to FIG. 2, which is a simplified illustration of device 826 with both display 635 and cavity 850 using light-based detection, in accordance with an embodiment of the present invention. FIG. 2 shows two stacked rows of emitters and receivers surrounding the perimeter of cavity 850.

Figure 3:
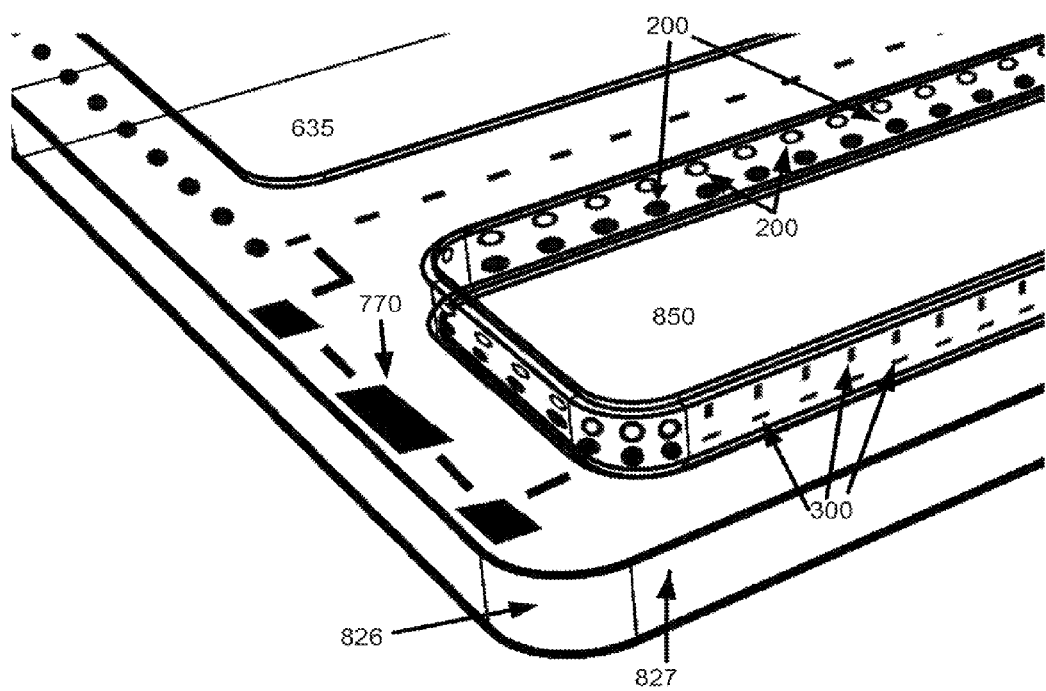
FIG. 3 is an enlarged view of the lower left portion of the device of FIG. 2, in accordance with an embodiment of the present invention.

Reference is made to FIG. 3, which is an enlarged view of the lower left portion of device 826, in accordance with an embodiment of the present invention. The lower left corner of device 826, where emitters 200 and receivers 300 are situated, is magnified in FIG. 3. Emitters 200 project light into cavity 850, and the light is detected by receivers 300. An object, such as a finger or a stylus, inserted into the cavity blocks some of the light beams, and correspondingly some of receivers 300 detect less light intensity. The geometry of the locations of receivers 300, and the light intensities they detect, suffice to determine cavity-space coordinates of the inserted object. Emitters 200 and receivers 300 are controlled for selective activation and de-activation by a controller. Generally, each emitter 200 and receiver 300 has I/O connectors, and signals are transmitted to specify which emitters and which receivers are activated.

The user input cavity detectors determine a Euclidean space aligned to the plane bound by the input cavity frame, and extending along the normal of that plane. Depending upon the mechanical design, this space is oriented differently relative to the space defined by the display plane and its normal. The coordinates of the user input cavity space are denoted X, Y and Z, and the rotational angles around these axes are denoted $\alpha$, $\beta$ and $\gamma$, respectively. The two finger distance scalar (grip) is called the S coordinate. These coordinates are now described.

TABLE I summarizes the input coordinates provided by the cavity subsystem. TABLE I does not include the display touch subsystem.

TABLE I

| Input coordinates of the cavity subsystem | | | |
| --- | --- | --- | --- |
| Dimension | Type | Resolution | Extension |
| X | Linear | High | Full |
| Y | Linear | High | Full |
| Z | Linear | Low | Limited |
| $\alpha$ | Rotational | Low | Limited |
| $\beta$ | Rotational | Low | Limited |
| $\gamma$ | Rotational | Low | Full |
| S | Scalar | High | Full |

The X and Y coordinates are along the plane bound by the cavity frame edges. These coordinates accurately cover the area bounded by the edges. The Z coordinate extends along the normal of the plane bound by the cavity edges, in effect measuring how far an object is inserted into the cavity. Detection along the Z dimension is accurate within a small range defined by the distance between the sensing layers. Detection within the accuracy range is based upon the differential of the signal level of the two sensing layers.

Figure 4:
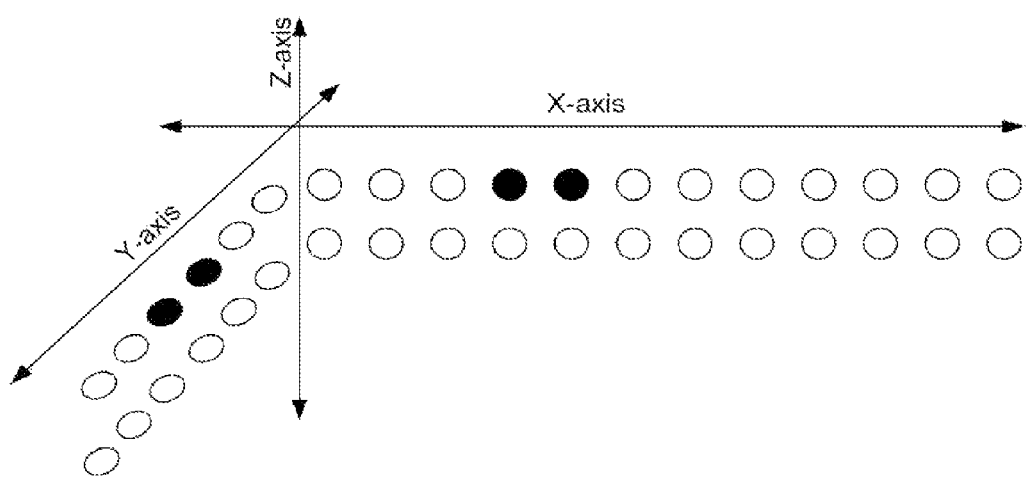
FIGS. 4 and 5 are simplified diagrams of light based detection of an object lowered into a user gesture input cavity using stacked rows of emitters and receivers, in accordance with an embodiment of the present invention.
Figure 5:
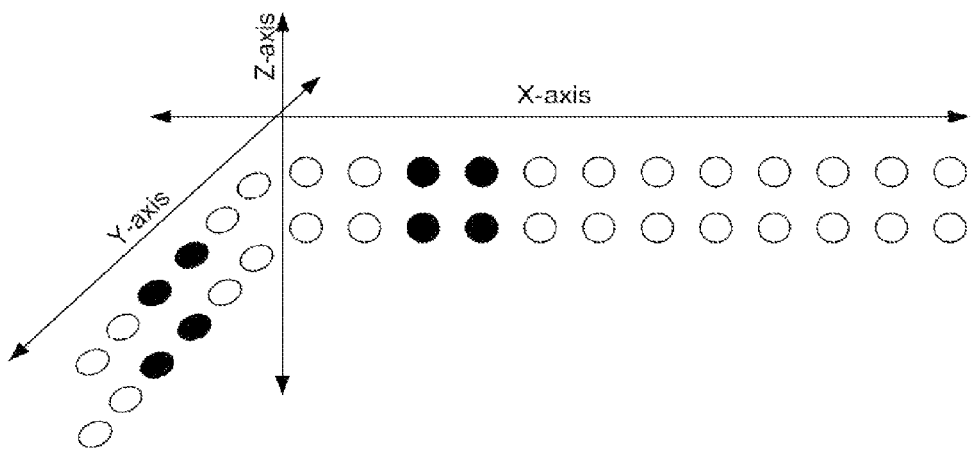

Reference is made to FIGS. 4 and 5, which are simplified diagrams of light based detection of an object lowered into a user gesture input cavity using stacked rows of emitters and receivers, in accordance with an embodiment of the present invention. White receivers detect expected light, and black receivers are blocked by an inserted object. FIGS. 4 and 5 show how to determine depth relative to a Z-axis. FIG. 4 shows the detection pattern of receivers when a finger is inserted into the upper portion of the cavity. FIG. 5 shows the detection pattern of receivers when a finger is inserted through the cavity.

The α and β angles are rotational and extend around the X and Y axes, respectively. Accuracy is related to the distance between the sensing layers and is generally less sensitive to smaller angles towards the XY plane normal. The rotational extension is more limited by human anatomy than by the sensor. There is a theoretical gap in detecting small angles relative to the XY plane, and the frame edges themselves also set a limit below ±90°. Sensing is done by calculating the angle between the detection points of the sensing layers.

Figure 6:
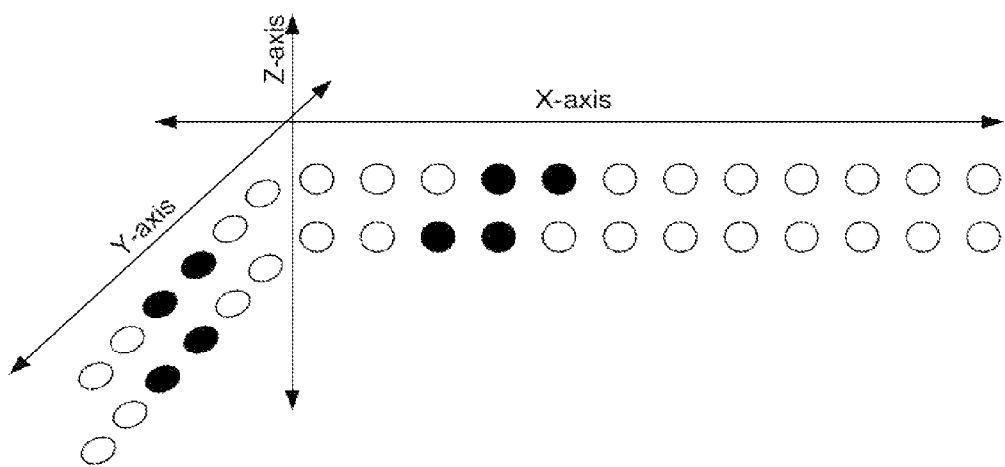
FIGS. 6-8 are simplified diagrams of rotation detection around a Y-axis, in accordance with an embodiment of the present invention.
Figure 7:
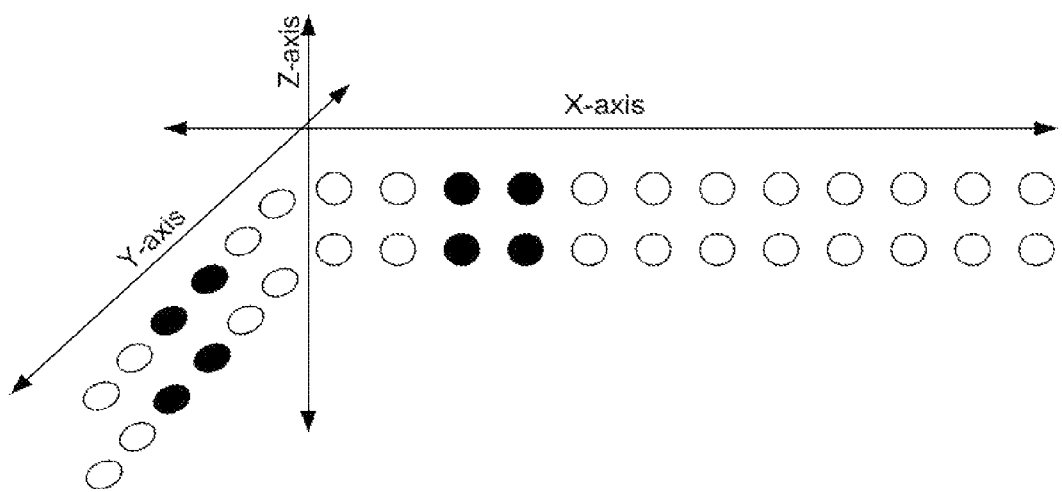
Figure 8:
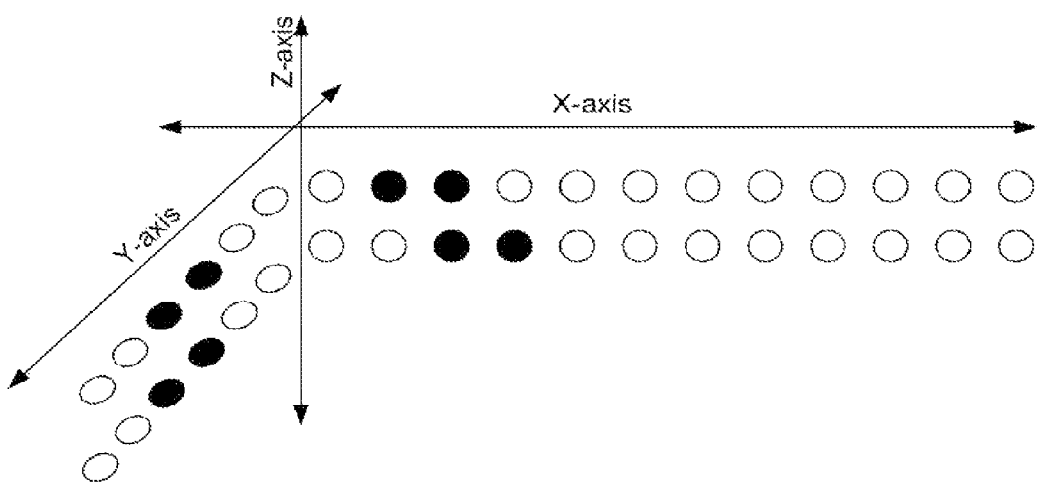
Figure 9:
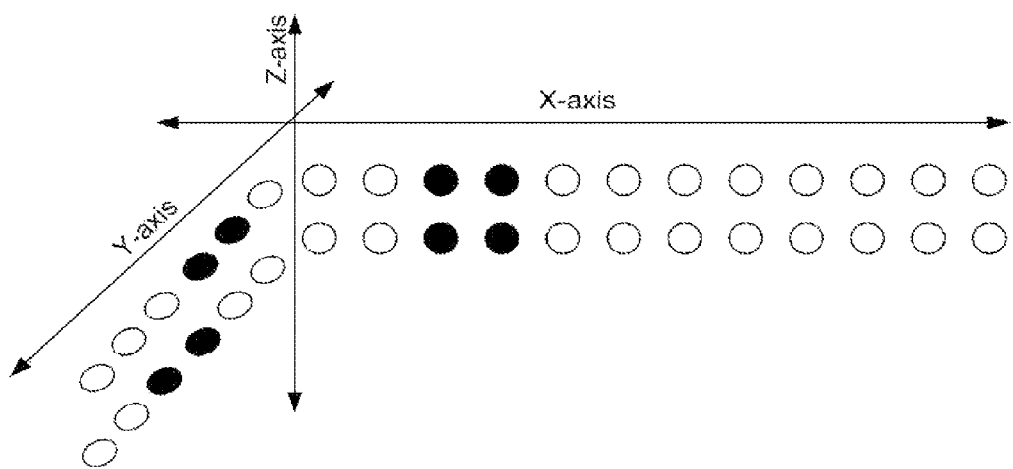
FIGS. 9-11 are simplified diagrams of rotation detection around an X-axis, in accordance with an embodiment of the present invention.
Figure 10:
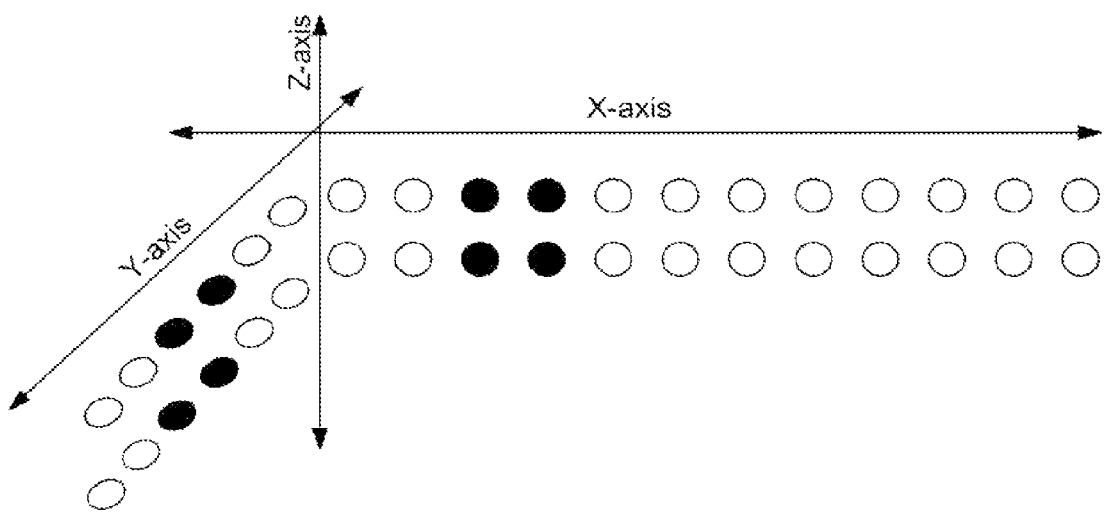
Figure 11:
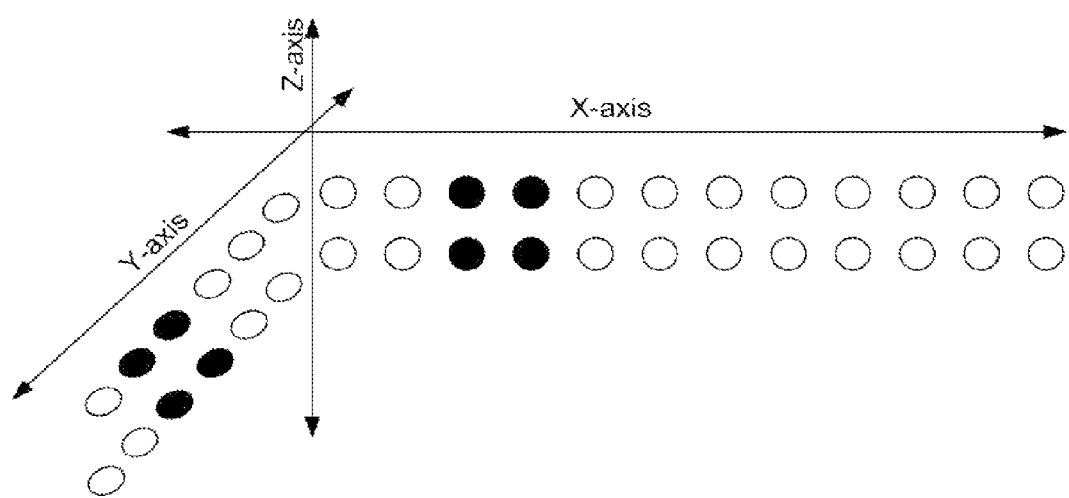

Reference is made to FIGS. 6-8, which are simplified diagrams of rotation detection around a Y-axis, in accordance with an embodiment of the present invention. FIG. 6 shows a detection pattern of receivers when a finger inserted into the cavity is tilted in one direction around the Y-axis. FIG. 7 shows the detection pattern of receivers when a finger inserted into the cavity is upright. FIG. 8 shows the detection pattern of receivers when a finger inserted into the cavity is tilted in a second direction around the Y-axis. Reference is made to FIGS. 9-11, which are simplified diagrams of rotation detection around an X-axis, in accordance with an embodiment of the present invention.

As such, when a single finger is inserted into the cavity, five user input coordinates are determined; namely, X, Y, Z, α, and β.

When two fingers are inserted into the cavity, two additional input coordinates are determined; namely, γ and S, thus providing a total of 7 input coordinates.

The S coordinate is a scalar and is defined by the distance between the two fingers inserted into the user input cavity. Accuracy of the S coordinate is high for all positive values; however, it is difficult to distinguish a zero value from a single finger. Sensing is done by calculating the distance between the X and Y coordinates of the two fingers.

The γ dimension is rotational and extends around the Z axis. It is only available in two-finger mode. Accuracy is high except for very small S values. Extension is unlimited, that is, sensing can be done for an infinite rotation. Sensing is done by calculating an angle based upon the X and Y deltas between the two fingers.

Figure 12:
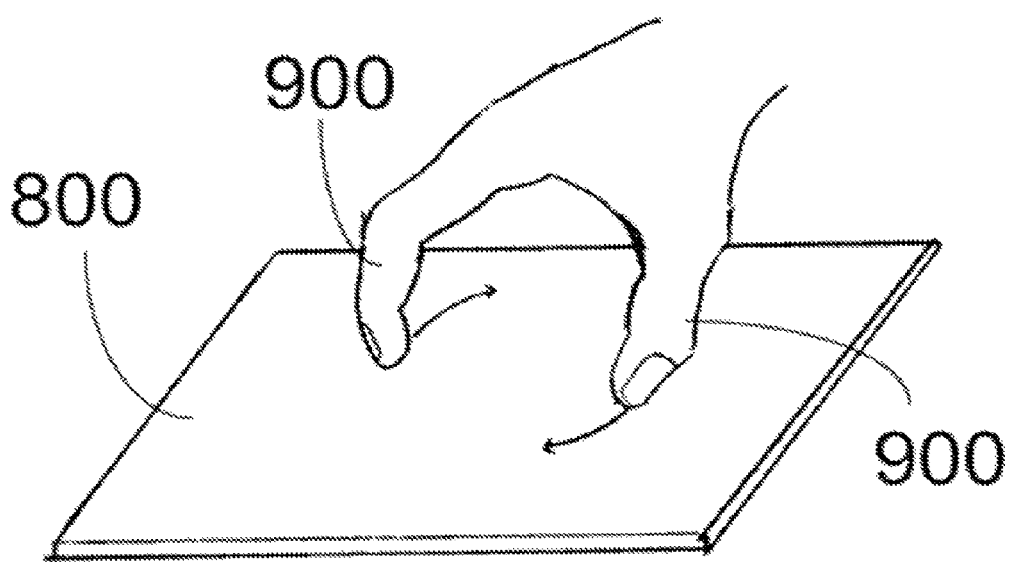
FIG. 12 is a simplified diagram of a rotation gesture around a Z-axis, whereby a user places two fingers on the screen and rotates them around a central point.

Reference is made to FIG. 12, which is a simplified diagram of a rotation gesture around a Z-axis, whereby a user places two fingers on the screen and rotates them around a central point.

Input from the cavity subsystem is preferably utilized according to the extent and accuracy of the different coordinates. The accuracy of X, Y, γ, and S is of advantage for continuous object manipulation, such as translation, rotation and scrolling. The lower accuracy coordinates are of advantage for additional functionality, such as menu navigation. From a user perspective this is easily understood; namely, (i) sweep one finger to scroll, (ii) tilt an inserted finger to open a pop-up menu, and (ii) use two fingers to manipulate objects, such as resizing and rotation.

The number of fingers inserted into the input cavity acts as an intuitive mode setting. For example, one finger may scroll and select menus, and two fingers may manipulate objects.

In some embodiments the low-resolution coordinates α, β and Z are used in combination for quick single-finger gestures to invoke transient commands, in a "tilt-and-insert" manner. Using all combinations of α, β and Z would complicate the UI. Therefore, a balanced scenario limits the possibilities. For example, insert a straight finger to enable scrolling, and insert a tilted finger to mimic a mouse right-click, say, to open a context-sensitive menu.

TABLE II summarizes the user cavity input coordinates, appropriate gestures for each coordinate, and examples of UI functions.

TABLE II

User Cavity Input Coordinates and UI Functions

| Coordinates | User Gesture | Example Use Case |
|---|---|---|
| X and Y | finger glide | scrolling |
| Z | poke the cavity | sub-menu selection and activation |
| α and β | tilt a finger in the cavity | additional object rotation; sub-menu selection |
| γ | two-finger rotation gesture | object rotation |
| S | pinch | scale and resize |

Figure 13:
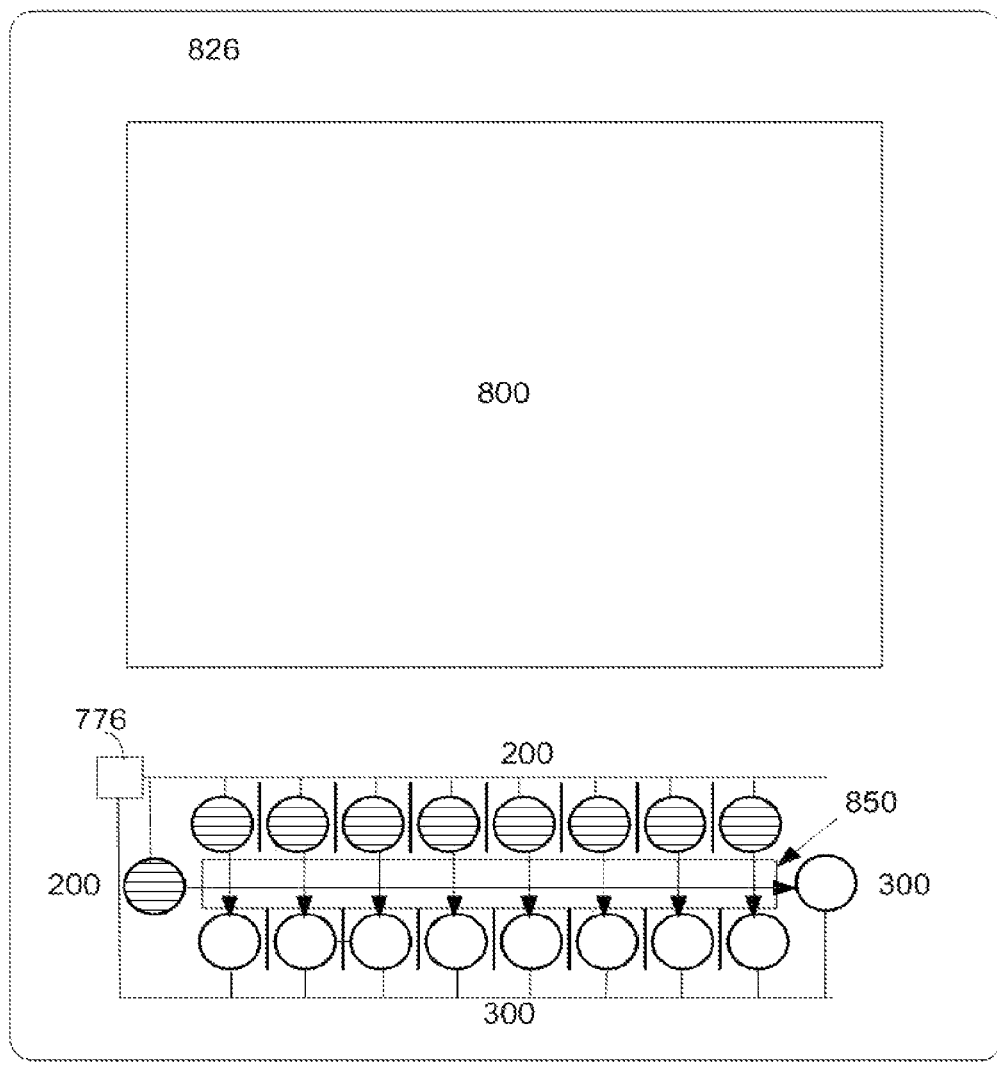
FIG. 13 is a simplified illustration of a device having a cavity for finger gesture user input that uses light-based detection, in accordance with an embodiment of the present invention.

In an embodiment of the present invention, plural emitters are arranged along two adjacent sides of a rectangular cavity, and plural receivers are arranged along the other two adjacent sides. Reference is made to FIG. 13, which is a simplified illustration of a device having a cavity for finger gesture user input that uses light-based detection, in accordance with an embodiment of the present invention. FIG. 13 shows a device 826 having a display 800 and a user gesture input cavity 850. Cavity 850 is surrounded with emitters 200 and receivers 300. Emitters 200 emit infra-red or near infra-red light beams into cavity 850, which are detected by corresponding receivers 300 that are directly opposite respective emitters 200. When an object is inserted into cavity 850, it blocks light from reaching some of receivers 300. By identifying, from the receiver outputs, which light beams have been blocked by the object, the object's location is determined. An emitter-receiver controller 776, connected to emitters 200 and receivers 300, coordinates activation of these elements and stores the receiver outputs. A calculating unit, included in controller 776 or in communication with controller 776, reads the receiver outputs and determines therefrom the presence and location of an inserted object. A processor 770 (shown in FIG. 3) connected to emitters 200 and receivers 300 and to display 635, causes display 635 to render a visual representation in response to output from receivers 300.

Figure 14:
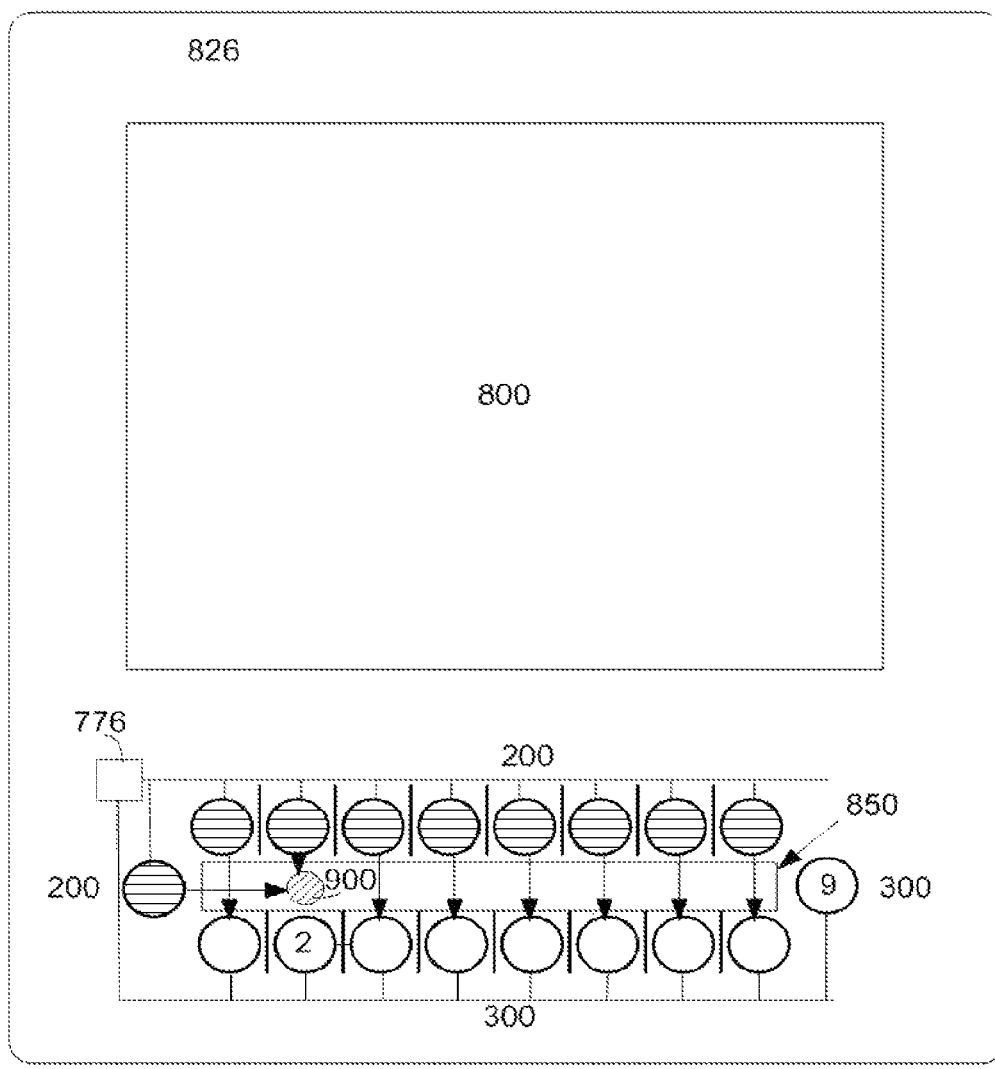
FIG. 14 is a simplified diagram of the device of FIG. 13 detecting a first inserted object, in accordance with an embodiment of the present invention.

Reference is now made to FIG. 14, which is a simplified diagram of device 826 detecting a first inserted object, in accordance with an embodiment of the present invention. FIG. 14 shows device 826 detecting a finger 900 inserted into cavity 850. Finger 900 blocks light from reaching some of receivers 300, marked as receivers 2 and 9. In accordance with an embodiment of the present invention, the location of finger 900 is determined from the crossed lines of the infra-red beams that the finger blocks. The receivers are numbered 1-9, from left to right. However, only blocked receivers are marked.

Figure 15:
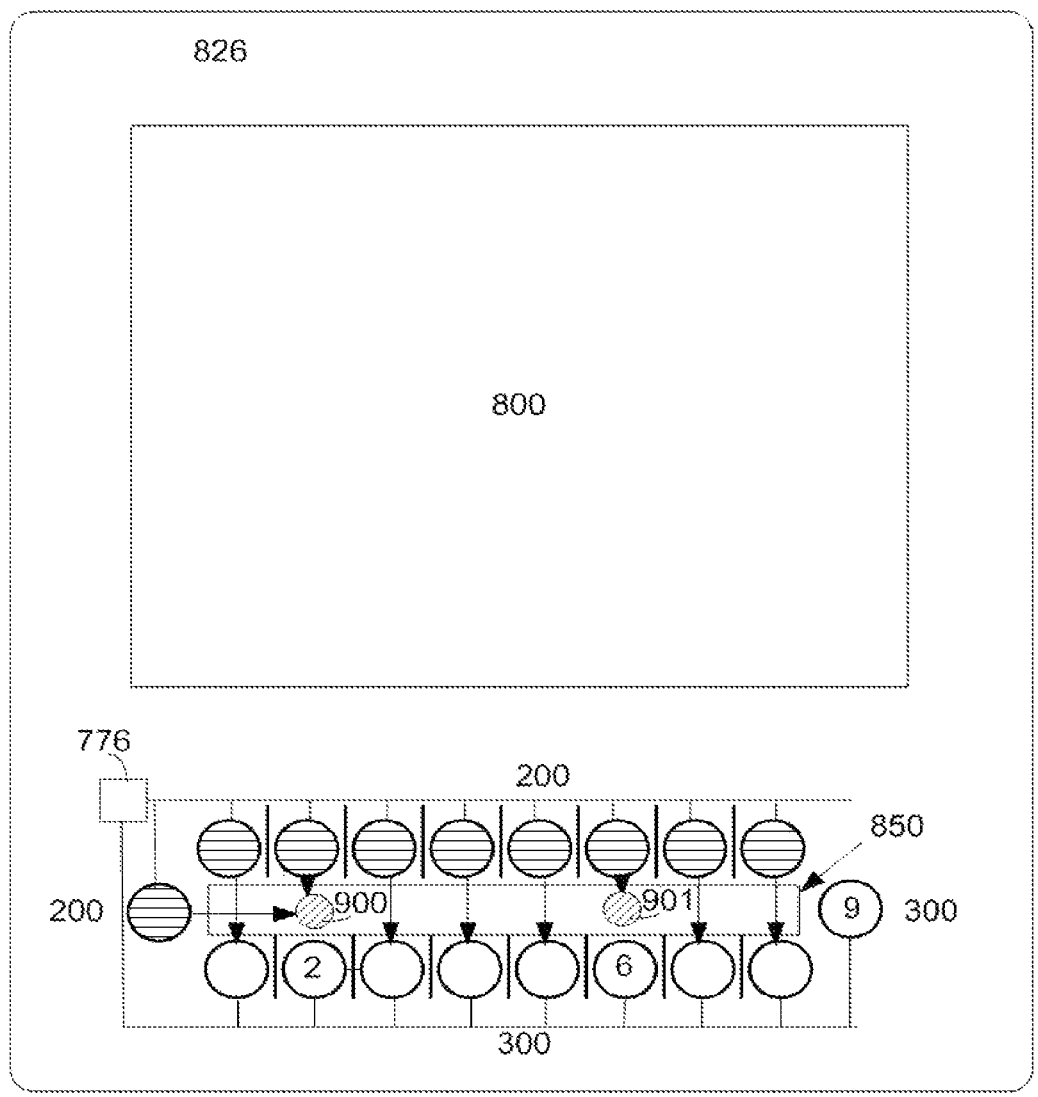
FIG. 15 is a simplified diagram of the device of FIG. 13 detecting two inserted objects, in accordance with an embodiment of the present invention.

Reference is now made to FIG. 15, which is a simplified diagram of device 826 detecting two inserted objects, in accordance with an embodiment of the present invention. FIG. 15 shows device 826 detecting two fingers 900 and 901 inserted into cavity 850. Finger 900 blocks light from reaching receivers 2 and 9, and finger 901 blocks light from reaching receiver 6. In accordance with an embodiment of the present invention, the locations of fingers 900 and 901 are determined from the crossed lines of the infra-red beams that the fingers block, whereby the blocked receivers are separated by unblocked receivers. This indicates two separate insertion points.

Figure 16:
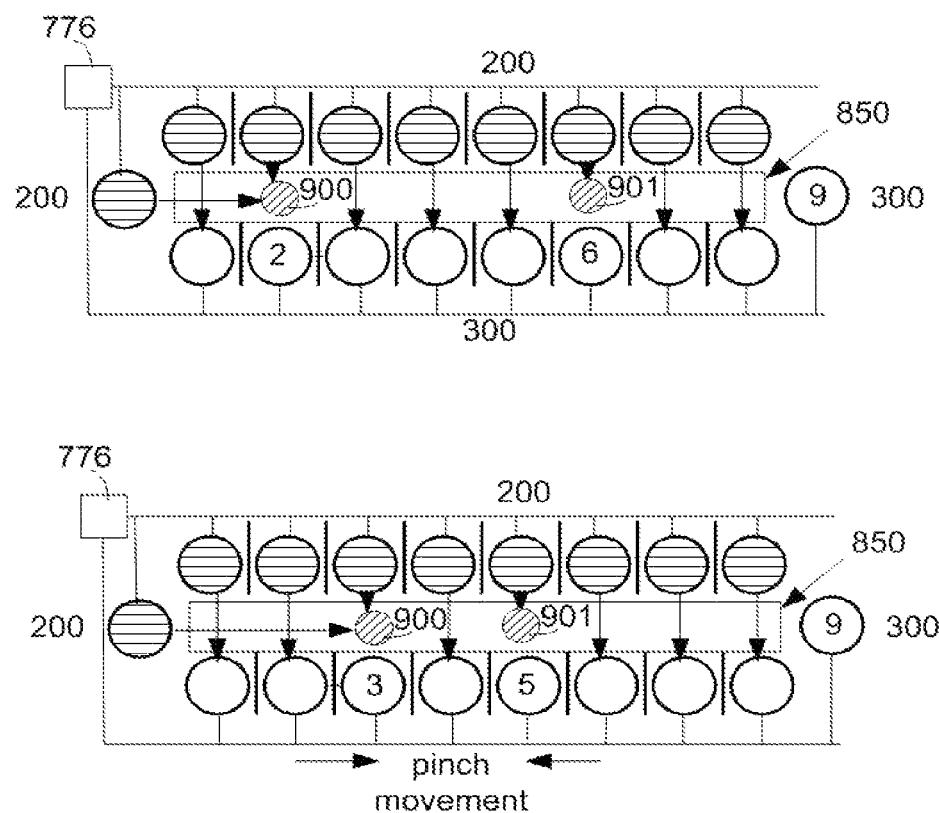
FIG. 16 is a simplified illustration of a cavity for finger gesture user input detecting a two-finger pinch gesture, in accordance with an embodiment of the present invention.

Reference is now made to FIG. 16, which is a simplified illustration of a cavity for finger gesture user input detecting a two-finger pinch gesture, in accordance with an embodiment of the present invention. FIG. 16 shows input cavity 850 detecting a two-finger pinch gesture. Cavity 850 in shown twice to illustrate changes in blocked receivers over time. The pinch gesture of FIG. 16 begins with receivers 2 and 6 being blocked, as shown in the upper diagram. As fingers 900 and 901 are brought closer together receivers 3 and 5 are blocked, as shown in the lower diagram. The direction of the pinch gesture is thus determined from changes in blocked receivers 300. The pinch gesture is indicated by two facing arrows beneath the lower diagram.

Figure 17:
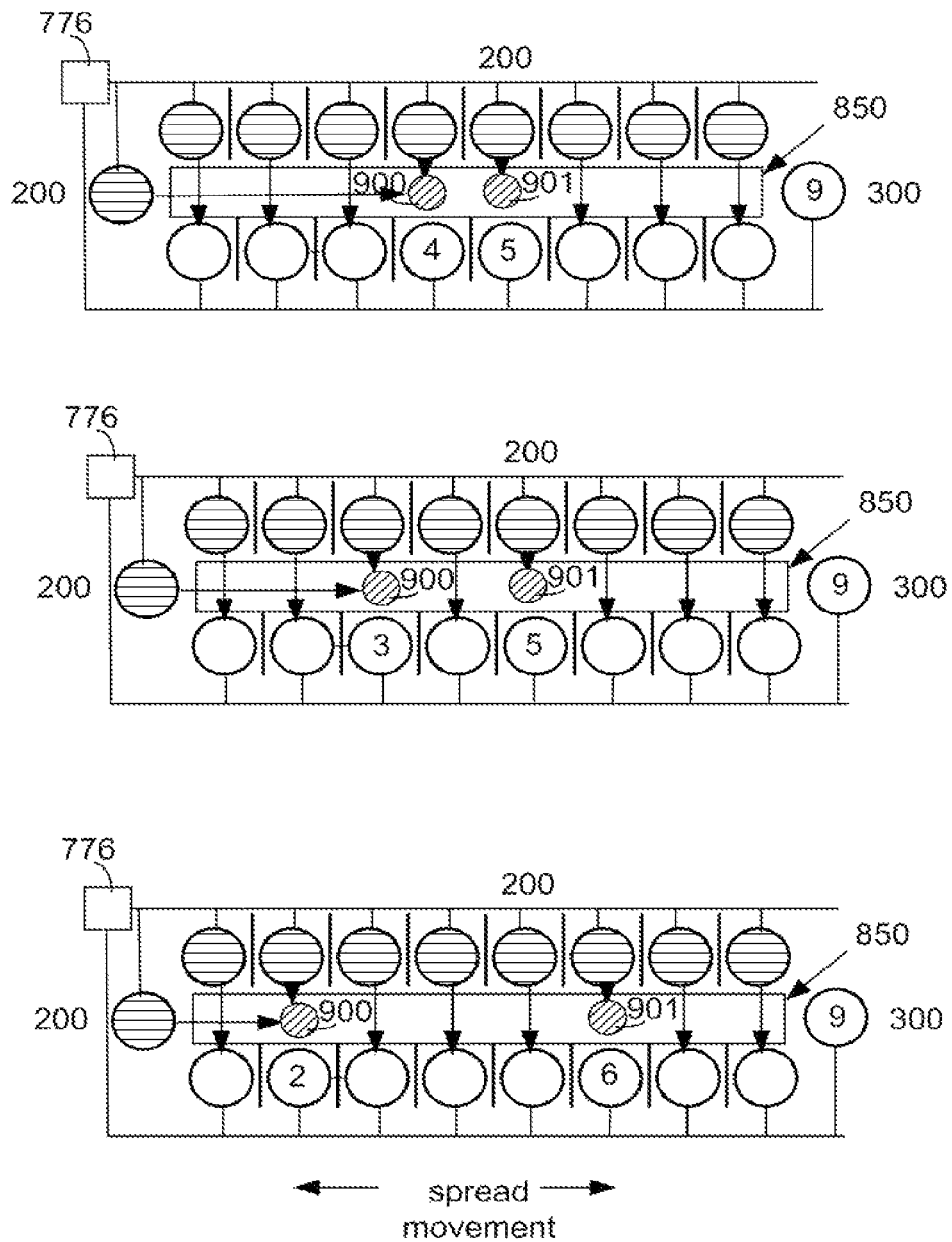
FIG. 17 is a simplified illustration of a cavity for finger gesture user input detecting a two-finger spread gesture, in accordance with an embodiment of the present invention.

Reference is made to FIG. 17, which is a simplified illustration of a cavity for finger gesture user input detecting a two-finger spread gesture, in accordance with an embodiment of the present invention. FIG. 17 shows a two finger spread gesture, which is an opposite of a two-finger pinch gesture. Cavity 850 in shown three times to illustrate changes in blocked receivers over time. The spread gesture of FIG. 17 begins with receivers 4 and 5 being blocked, as shown in the upper diagram. As fingers 900 and 901 are spread apart, the distance between the blocked receivers increases. Thus, receivers 3 and 5 are blocked in the middle diagram, and receivers 2 and 6 are blocked in the bottom diagram. The direction of the spread gesture is thus determined from changes in blocked receivers 300. The spread gesture is indicated by two outward-facing arrows beneath the bottom diagram.

In many devices today a pinch gesture performed on a touch screen activates a zoom-out function on the displayed screen image, and a spread gesture performed on a touch screen activates a zoom-in function on the displayed screen image. The present invention enables performing these gestures in cavity 850 without blocking the user's view of the image on the screen. The problem of obstructing the user's view is especially acute in conventional devices where pinch and spread gestures are performed along a screen diagonal, as the user's hand blocks a large portion of the screen in such cases. According to certain embodiments, translating a single finger in a first direction along cavity 850 corresponds to a conventional pinch gesture on the touch screen, and translating a single finger in the opposite direction along cavity 850 corresponds to a conventional spread gesture on the touch screen. This simplifies the gesture and allows easy adaptation of existing application software to devices of the present invention, whereby the user gesture input cavity driver sends a message equivalent to a pinch or spread gesture to the host processor or application software.

It is evident from FIGS. 13-17 that the receiver along the narrow edge of cavity 850 is blocked when a finger is inserted in the cavity. This is a result of the narrow shape of the cavity. Thus, input gestures are distinguished from one another on the basis of detectors along only one edge. Therefore, in some embodiments using narrow cavities, or otherwise requiring detection in only one dimension, emitters and receivers are provided along the longer cavity edge, but not along the narrow edge. It is not necessary to detect the inserted finger along the narrow edge because it is not important where along the second edge the finger is inserted; it is only important to know where the one or more fingers are inserted along the longer edge and what gesture they perform relative to that edge.

Alternatively, in such cases one emitter-detector pair is provided on the narrow cavity edge and this is used to determine if a finger is inserted at all. This saves power, as compared with the power required to pulse a plurality of emitters along the longer edge. Once a finger insertion is detected, only the emitter-detector pairs along the longer edge are activated to determine the exact nature of the user gesture.

In FIGS. 2 and 3 light emitters 200 are arranged in layers along at least one wall of cavity 850, and emit light pulses into the space of cavity 850. Light receivers 300 are arranged in like layers along an opposite wall of cavity 850, and detect the emitted light pulses when the cavity space is empty, but when object 900 is inserted into cavity 850 it blocks a portion of the emitted light pulses from arriving at receivers 300. As such, processor 770 is able to detect the presence of an object in cavity 850 and the depth at which the object is inserted into cavity 850, based on outputs of receivers 300 in the different layers. When a finger is inserted into cavity 850 it is first detected by receivers 300 in the upper layer. When the finger proceeds deeper inside cavity 850, it is detected by receivers 300 in the upper and lower layers. The time between the first upper layer detection and subsequent lower layer detection is used to determine the downward velocity of the object into the cavity. This is a useful attribute of the user interface as it enables the system to distinguish a hard or fast insertion from a slow or soft insertion. Such information is useful, for example, in gaming environments that support varying degrees of force applied to an avatar's actions, or in artistic paintbrush rendering where the force of the brushstroke altars its thickness. A speed of removal of the object from the cavity is similarly calculated by determining the interval between detecting the removal of the object in the different layers.

Another advantage of multiple stacked layers of emitters and receivers is that it enables determining an angle of approach through the cavity and also a standing angle of the object inside the cavity. One use for this information is to enable user gestures of inserting a finger and tilting it in various directions. For example, to scroll a document a user inserts his finger and tilts it forward without moving the bottom of his finger to scroll. The degree of tilt sets the scrolling speed.

Another advantage of multiple stacked layers of emitters and receivers is that it enables detecting the two or more touches in a multi-touch in an order. Multiple concurrent touches, such as two diagonally opposed touches are ambiguous because the detection pattern of receivers is substantially the same for both cases of diagonal touches, i.e., concurrent upper-left and lower-right touches generate the same pattern of blocked receivers as concurrent upper-right and lower-left touches. When one touch is actuated slightly before the second touch, this can be used to disambiguate the touch pattern. For example, if the first detected touch is unambiguously determined to be at the lower left corner, then the subsequent second touch must be at the upper right corner. In a system with multiple stacked layers of emitters and receivers, each layer provides an opportunity to detect the insertion one finger before another, increasing the likelihood that this is detected.

Figure 18:
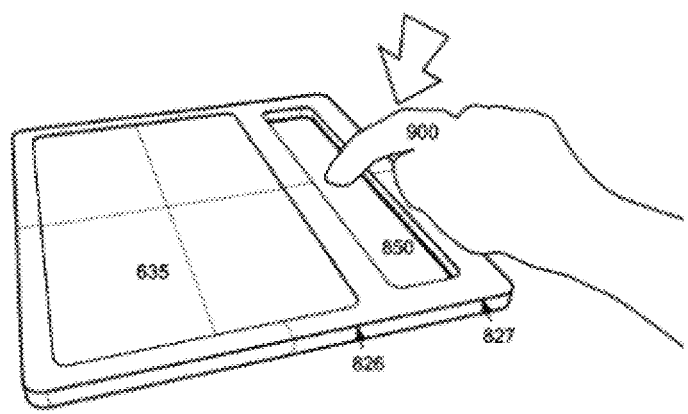
FIG. 18 is a simplified illustration of a device having a cavity for finger gesture user input that uses light-based detection and a finger inserted therein, in accordance with an embodiment of the present invention.

Reference is made to FIG. 18, which is a simplified illustration of a device having a cavity for finger gesture user input that uses light-based detection and a finger inserted therein, in accordance with an embodiment of the present invention. FIG. 18 shows the light-based user interface of FIGS. 1-3, with object 900 lowered into cavity 850.

Figure 19:
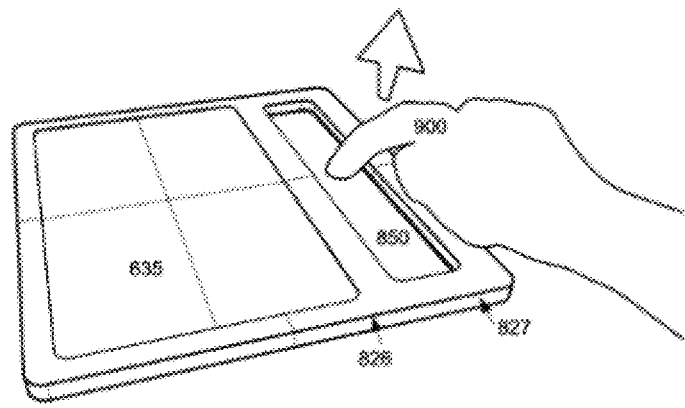
FIG. 19 is a simplified illustration of a device having a cavity for finger gesture user input that uses light-based detection and a finger lifted therefrom, in accordance with an embodiment of the present invention.

Reference is made to FIG. 19, which is a simplified illustration of a device having a cavity for finger gesture user input that uses light-based detection and a finger lifted therefrom, in accordance with an embodiment of the present invention. FIG. 19 shows the light-based user interface of FIGS. 1-3, with object 900 raised from cavity 850.

Figure 20:
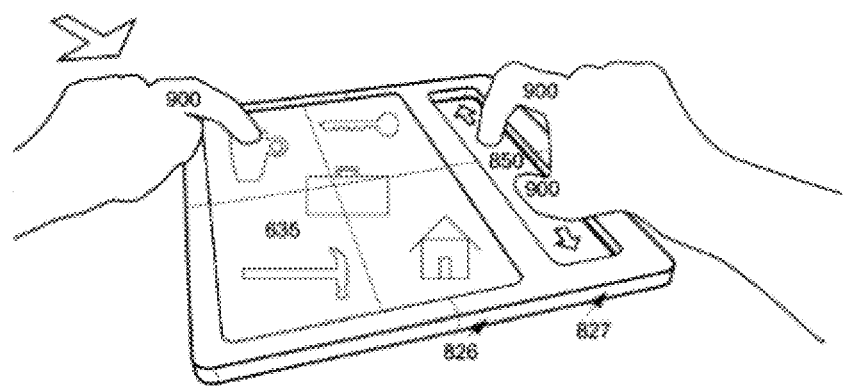
FIGS. 20 and 21 are simplified diagrams of user input combining a touch screen gesture and an input cavity gesture, in accordance with an embodiment of the present invention.
Figure 21:
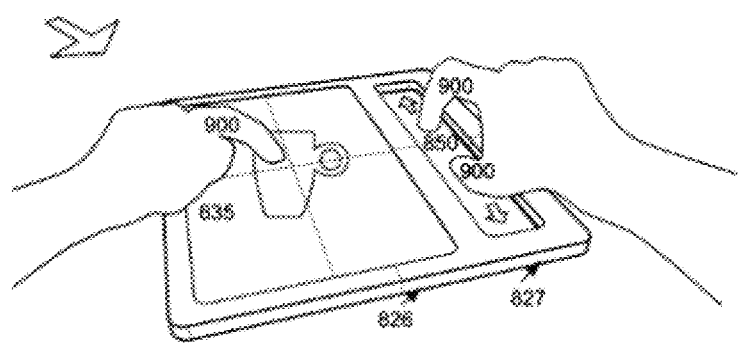

According to further features of the invention, a device includes both a user gesture input cavity and a touch sensitive display. This allows for combination gestures where a user performs a gesture on the screen and a gesture in the cavity. In this regard, reference is made to FIGS. 20 and 21, which are simplified diagrams of user input combining a touch screen gesture and an input cavity gesture, in accordance with an embodiment of the present invention. FIGS. 20 and 21 show the light-based user interface of FIGS. 1-3, used in conjunction with a touch screen display 635. In FIG. 20 an image is displayed on the screen. A user desires to zoom the image. In conventional systems a zoom function automatically zooms in on the center of the displayed portion of the image. In order to zoom in on a different portion of the image in a conventional system, the user needs to pan the image so that it is centered at a desired location and then perform a zoom gesture, typically a pinch or spread gesture. In FIG. 20 the user selects a center for zooming by touching a desired picture element while performing a zoom gesture in the user gesture input cavity. The result, shown in FIG. 21, is the zoomed image centered around the touched location. In certain cases, the user selects a screen object by tapping on it. A subsequent resize operation, executed in response to a gesture in the cavity, is executed when the user is not touching the screen. The resize operation centers the resized image on the selected object. In other cases, the user pans the image by dragging a finger on the display while performing a gesture in the input cavity to resize the image. Thus, the resize and pan occur at the same time and the user controls both operations.

Figure 22:
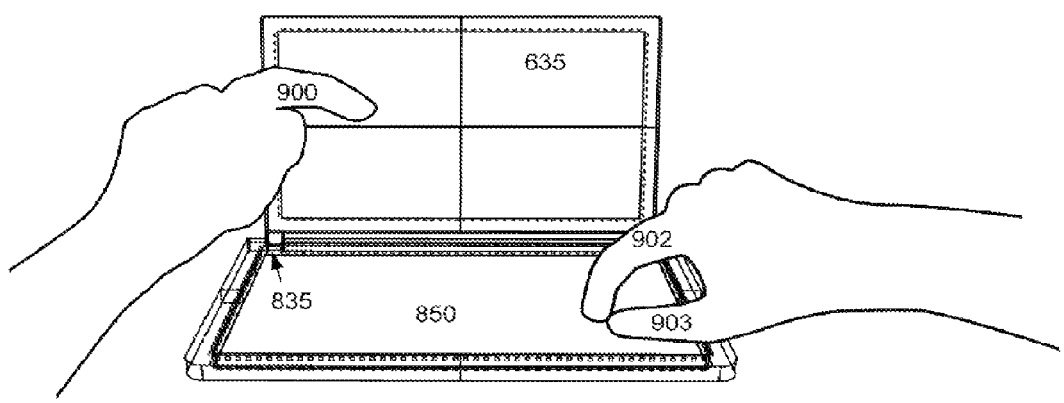
FIG. 22 is a simplified diagram of a device having a display and a user input cavity connected by a hinge, whereby the display is upright and supported by the cavity, in accordance with an embodiment of the present invention.

Reference is made to FIG. 22, which is a simplified diagram of a device having a display and a user input cavity connected by a hinge, whereby the display is upright and supported by the cavity, in accordance with an embodiment of the present invention. FIG. 22 shows a left-hand finger 900 touching the display, while two right-hand fingers 902 and 903 are inserted into the user cavity.

Figure 23:
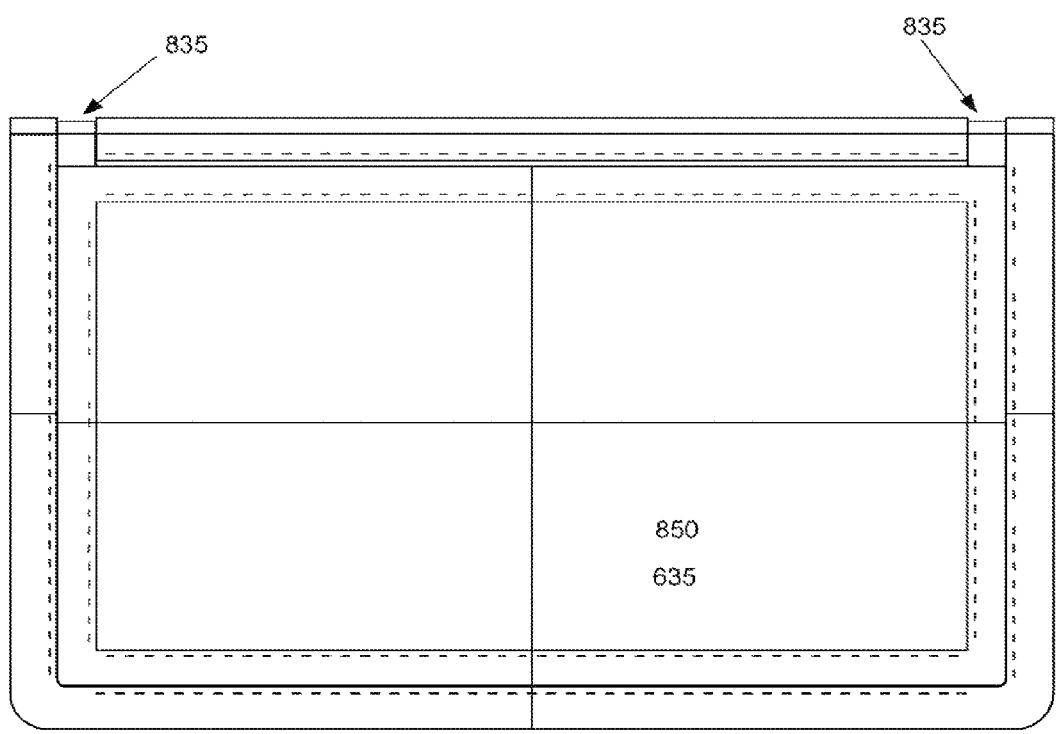
FIGS. 23 and 24 are simplified diagrams of the device of FIG. 22 where the cavity is folded onto the display, in accordance with an embodiment of the present invention.
Figure 24:
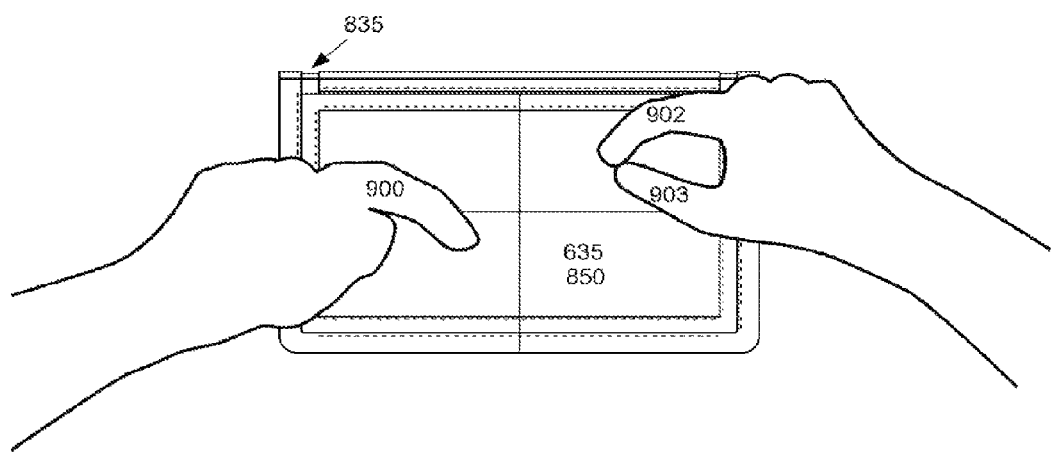

Reference is also made to FIGS. 23 and 24, which are simplified diagrams of the device of FIG. 22 where the cavity is folded onto the display, in accordance with an embodiment of the present invention. FIGS. 22-24 show a light-based user interface for an electronic device that has a display 635 within one section of the housing, and a cavity 850 within another section of the housing. These two sections are connected by a hinge 835 that enables folding the sections onto each other. Display 635 is mounted in the first section, and cavity 850 is located within the second section. The frame around cavity 850 fits along the edges of the first section when the sections are folded.

By aligning the user input cavity frame and the display unit on the same plane with a centered shaft near one of the edges, the frame can be rotated continuously relative to the display. This provides flexibility and makes the unit robust, as a user is not restricted by the extent to which the frame can be opened. By making the user input cavity frame slightly thicker than the display unit, the sensing layers of the frame enclose the display unit when folded. By using collector rails (not shown) at the two shafts in hinge 835 that lock the display unit to the user input cavity frame, there are no wires that get twisted, and the user input cavity frame may rotate continuously around hinge 835. At least two collectors are used for power feed. Control and touch event data are superimposed on the power signals, or have their own collector rails.

Figure 25:
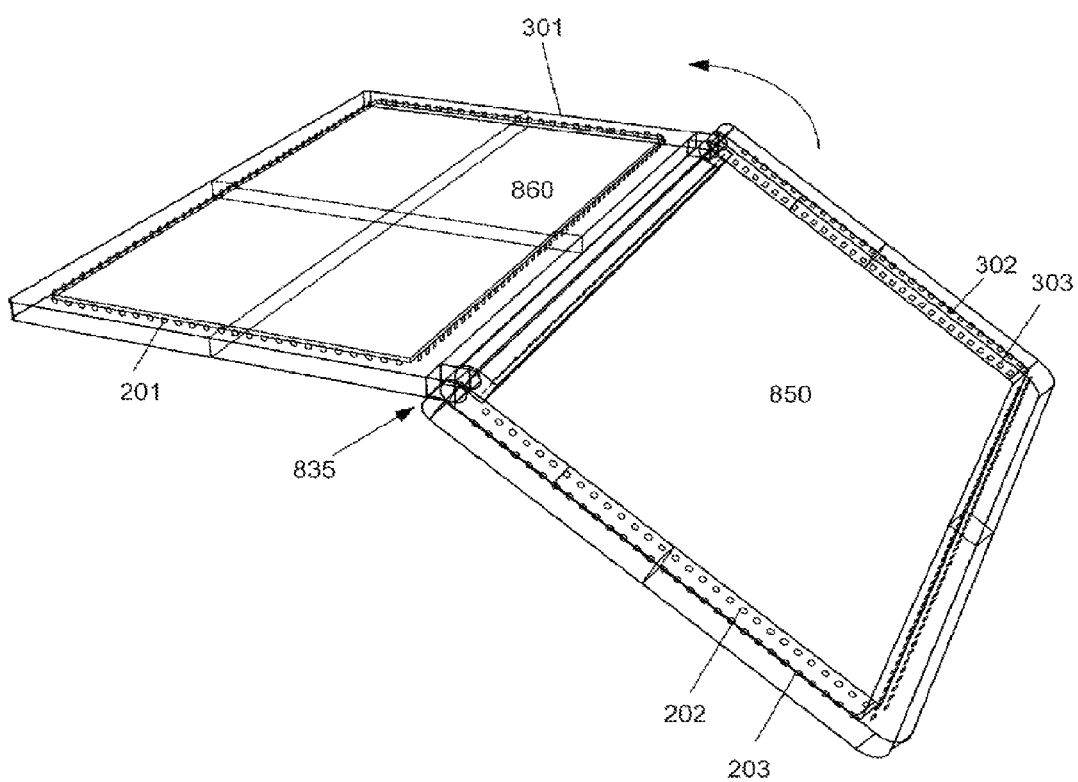
FIGS. 25 and 26 are simplified illustrations of a device with a light-based user interface that detects depth of a finger relative to a touch screen when a housing of the device is folded, in accordance with an embodiment of the present invention.
Figure 26:
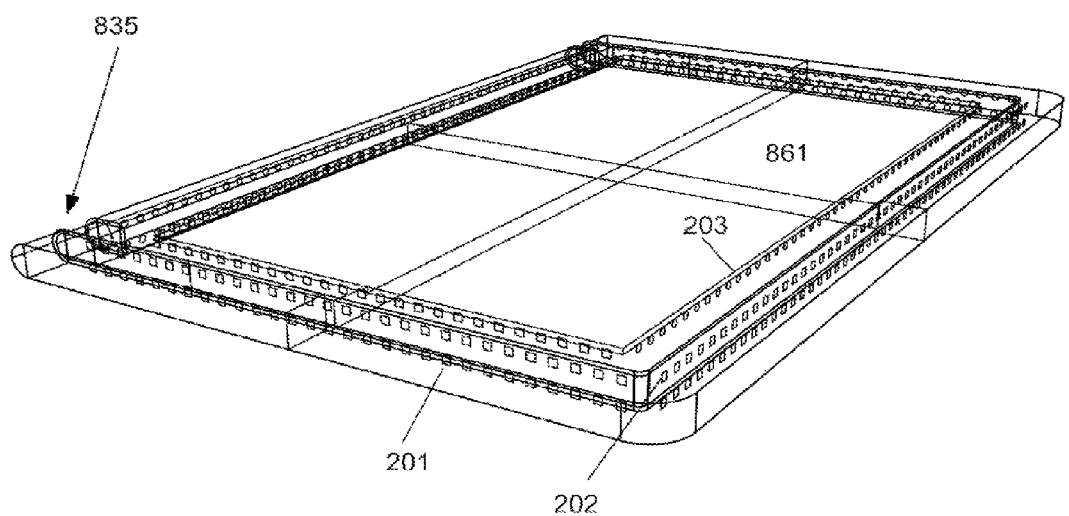

Reference is made to FIGS. 25 and 26, which are simplified illustrations of a device with a light-based user interface that detects depth of a finger relative to a touch screen when a housing of the device is folded, in accordance with an embodiment of the present invention. The device display is a touch screen 860. When a hollow frame 850 is folded onto touch screen 860, multiple layers of touch detection are provided; namely, a higher layer provided by the emitters and receivers surrounding the hollow frame, and a lower layer provided by the touch screen. In FIG. 25, hollow frame 850 is surrounded by two stacked layers of emitters, 202 and 203, and receivers, 302 and 303. In other embodiments, only one layer of emitters and receivers is provided. Touch screen 860 is surrounded by one layer of emitters 201 and receivers 301. However, the touch detection technology used for touch screen 860 may be any technology, such as resistive or capacitive, instead of light-based. When the hollow frame is folded onto the display, the hollow frame bezel is slightly raised above the touch screen, to provide object detection above the display.

FIG. 26, showing the folded frame, includes a 3D touch screen 861. FIG. 26 shows that when the frame is folded onto the screen, the screen is surrounded by three stacked layers of emitters 201-203 and receivers 301-303, at different heights above the display.

Figure 27:
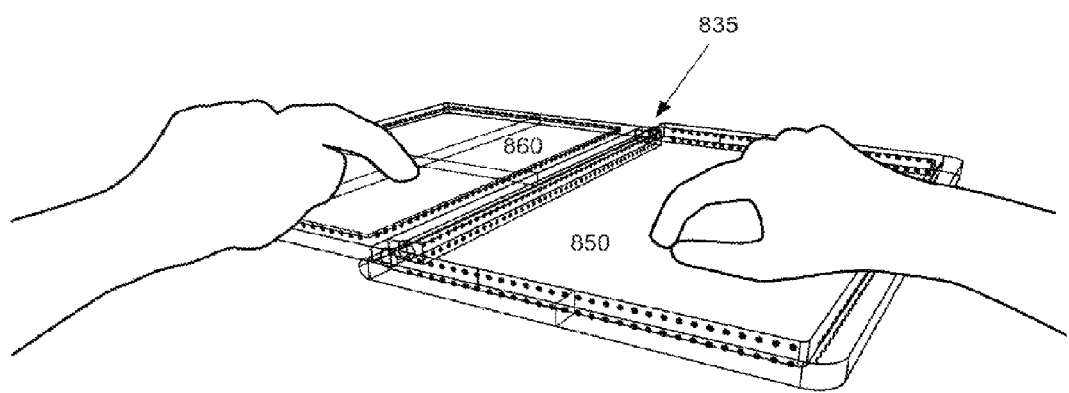
FIG. 27 is a simplified diagram of the device of FIG. 22 where the cavity is placed alongside the display, in accordance with an embodiment of the present invention.
Figure 28:
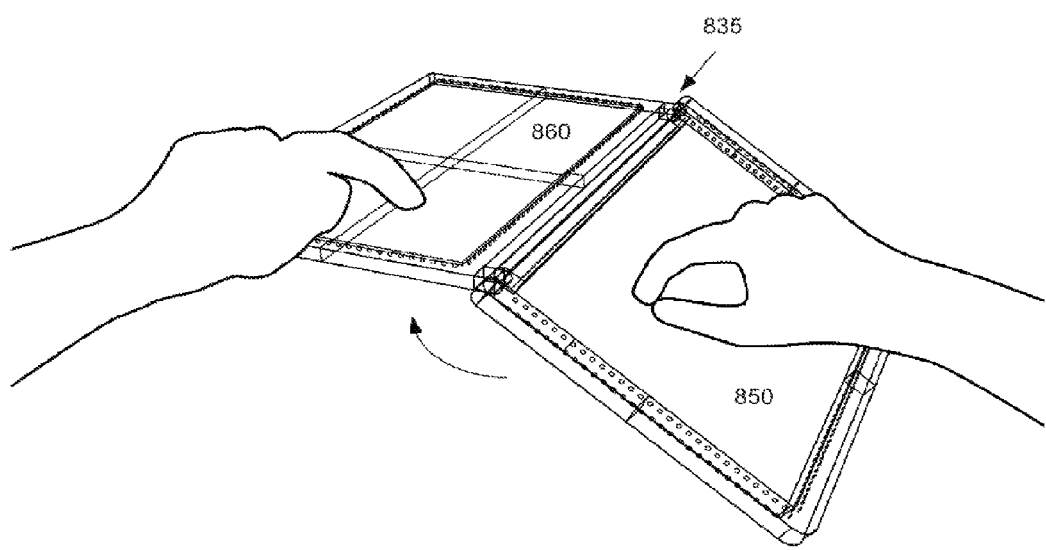
FIGS. 28 and 29 are simplified diagrams of the device of FIG. 22 where the cavity is folded onto the back of the device, in accordance with an embodiment of the present invention.
Figure 29:
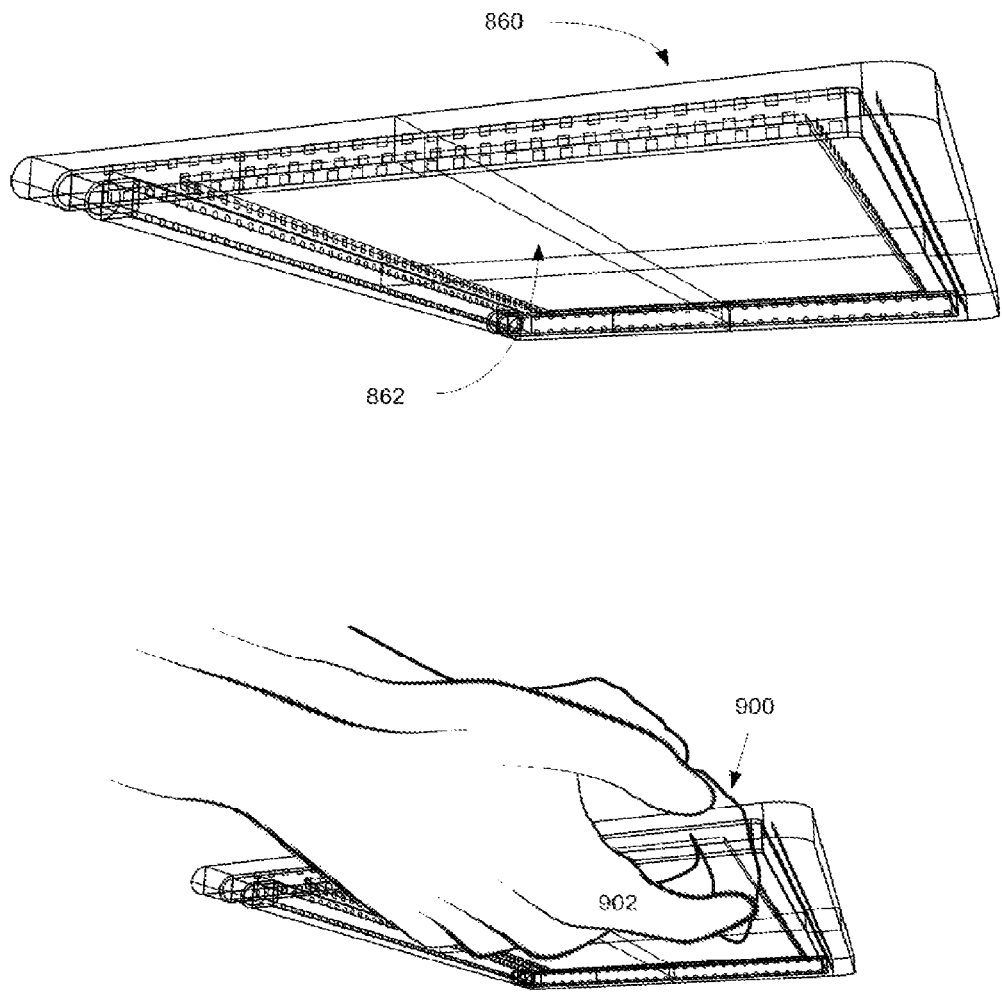

Reference is made to FIG. 27, which is a simplified diagram of the device of FIG. 22 where the cavity is placed alongside the display, in accordance with an embodiment of the present invention. Reference is also made to FIGS. 28 and 29, which are simplified diagrams of the device of FIG. 22 where the cavity is folded onto the back of the device, in accordance with an embodiment of the present invention. FIG. 27 shows an open device with a cavity 850 alongside a touch screen 860 joined by a hinge 835. FIG. 28 shows folding of cavity 850 onto the back of touch screen 860.

FIG. 29 shows the folded frame, touch screen 860 on the front side of the device, and touch sensitive back 862 of the device. FIG. 29 shows the folded frame twice. In the upper portion of FIG. 29, the device is shown with touch screen 860 and touch sensitive back 862 of the device. In the lower portion of FIG. 29, a left-hand finger 900 is touching the touch screen while a right-hand finger 902 engages the touch sensitive back of the device.

FIG. 27 shows the open device with cavity 850 alongside touch screen 860 joined by hinge 835. In this unfolded operating mode the user input cavity is separated from the display unit and aligned with the extended display XY plane, or aligned at an angle thereto. The user input cavity subsystem provides the 7 user coordinates described hereinabove. The angle of the user input cavity frame that is most convenient may be adjusted by the user. Typically, a user selects an object using the display touch, and then uses the user input cavity to manipulate the selected object.

Folding the user input cavity frame towards or away from the user may depend upon the use case. Some use cases are as follows.

When holding the unit in the air, convenience is achieved with the input cavity frame approximately 45° towards the user, or folding it 90° away from the user.

When the unit is resident on a table, the display may be placed flat on the table and the user input cavity frame can be positioned straight up at an angle of 90°. Alternatively, with the device resident on a table, the user input cavity frame can also be completely folded out to form a continuation of the display plane. Yet another alternative is that the frame doubles as a support for an upright display, as illustrated in FIG. 22.

Moving along the Z axis in a 3D realm has always been a challenge using 2D input devices. When using a mouse, the scroll wheel and/or right-click plus Y movement have become standard methods of manipulating objects in the Z dimension. Neither of these methods are available when using a touch screen.

Aligning the user input cavity frame along the YZ plane, e.g., by standing the frame upright on the right side on a horizontal display, renders the cavity's Y coordinate an intuitive Z movement control for a 3D UI. Moreover, user gestures in the cavity do not obstruct the user's view of the display, which a Z movement of a finger on top of the display would obstruct.

Figure 30:
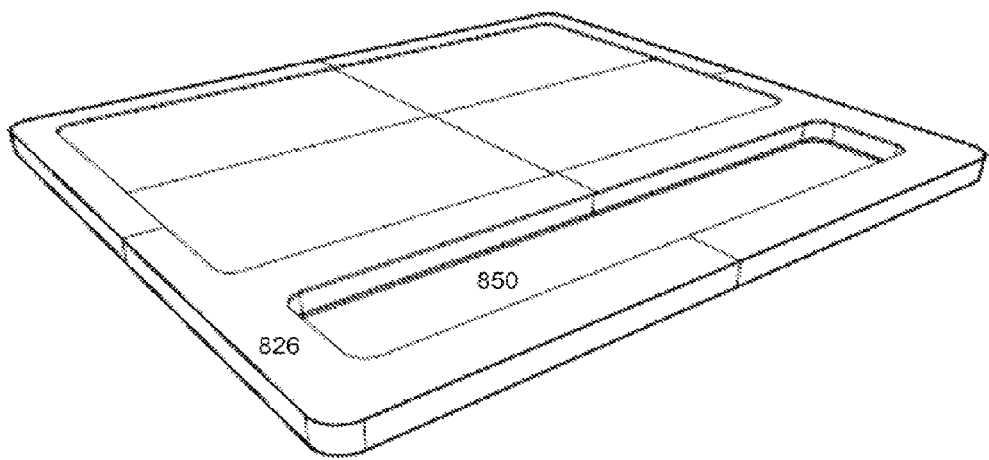
FIG. 30 is a simplified illustration of a device having a cavity for finger gesture user input that uses light-based detection, formed as a handle for carrying the device, in accordance with an embodiment of the present invention.

Reference is made to FIG. 30, which is a simplified illustration of a device 826 having a cavity for finger gesture user input that uses light-based detection, formed as a handle for carrying the device, in accordance with an embodiment of the present invention. Touch sensitive cavity 850 forms the handle, and the device detects finger gestures within the handle.

Figure 31:
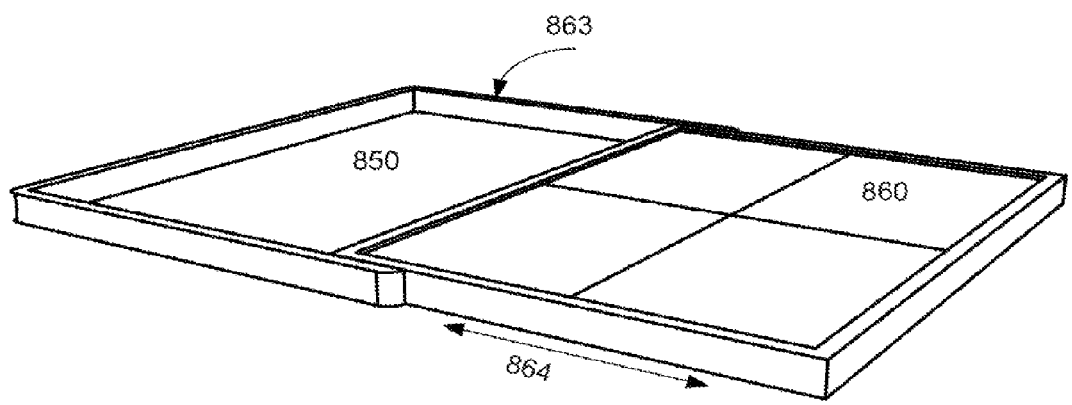
FIG. 31 is a simplified illustration of a device having a retractable frame that, when opened, forms a cavity for finger gesture user input that uses light-based detection, in accordance with an embodiment of the present invention.

Reference is made to FIG. 31, which is a simplified illustration of a device having a retractable frame that, when opened, forms a cavity for finger gesture user input that uses light-based detection, in accordance with an embodiment of the present invention. FIG. 31 shows a touch screen 860 and a user interface cavity 850 that detects finger gestures. Cavity 850 is formed by extending retractable three-sided frame 863. An arrow 864 indicates the extension-retraction path of frame 863.

Figure 32:
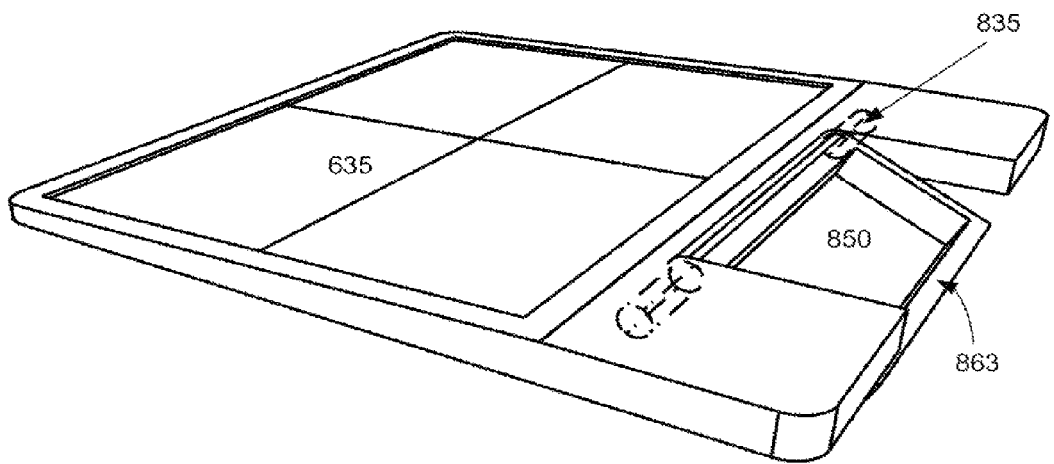
FIG. 32 is a simplified illustration of a device having a cavity for finger gesture user input that rotates around a hinge, in accordance with an embodiment of the present invention.

Reference is made to FIG. 32, which is a simplified illustration of a device having a cavity for finger gesture user input that rotates around a hinge, in accordance with an embodiment of the present invention. FIG. 32 shows a display 635 and a user interface cavity 850 that detects finger gestures. Cavity 850 is formed by a frame 863 that is connected to the device by a rotatable hinge 835.

Android Launcher Application

Aspects of the present invention include an architecture for integrating a user interface gesture cavity into the ANDROID® operating system. Similar architectures are used for other operating systems. The Android launcher is the initial UI from which a user activates applications. The launcher is activated when the user presses a "Home" button. Android provides a standard launcher, and there are many third party launchers. Many device vendors provide their own launcher. Aspects of the present invention include an Android UI that supports features provided by the present invention; namely, a touch input cavity separate from the screen, and touch information regarding the screen's Z-plane, beyond the binary touch/no-touch information provided by conventional touch screen devices.

In general, Android launchers provide a workspace divided into multiple screens. The user switches between the different screens, typically by performing a sideways sweep gesture, i.e., by gliding a finger across the width of the screen. A certain area of the workspace is fixed so that it does not switch with the screens. This fixed area, often called a "dock", contains icons for launching popular applications, e.g., a dialer, a program drawer, and an Internet search. The workspace has a background shared by all screens that typically slides in sync with the screen switches.

Each screen holds widgets, shortcuts, folders and live folders, which are real-time views on the screen of a content provider. A live folder displays data from a source without forcing the user to launch an application. As such, a live folder may be used to display contacts, bookmarks, email, playlists, and RSS feeds. Screens usually have a grid layout, so that icons and widgets cannot be placed at any arbitrary position. Performing a long hold on an item on any screen switches mode so that the item can be moved, or dragged to a "trash bin." Performing a long hold on an empty portion of a screen opens a menu for a user to select new items to be added to the screen.

The launcher also provides an application "drawer," which is opened from any screen and contains a list of all installed applications as labels or icons. Typically the list is in the form of a scrollable list or a multi-page grid. Performing a long hold on an application label or icon within the application drawer switches to a mode where the application can be placed on any screen.

To summarize, a launcher must be able to handle widgets, live folders and application startups, and should be able to handle user folders, shortcuts and wallpaper.

The workspace in most launchers is divided into screens containing shortcuts, widgets, folders and live folders. The workspace in an embodiment of a launcher for the present invention is conceptually configured in the 3D realm, with the workspace screens being distributed among various objects, surfaces or virtual rooms that provide logical grouping of items. The launcher UI is manifested as a scene graph which can be modeled in 2D or 3D.

In an embodiment of the present invention, the launcher contains wallpaper as a background image for the 3D realm, although there are differences between the type of image appropriate for 3D backgrounds and 2D wallpapers. In most cases, the outlook of the 3D background is sufficiently different from desktop wallpaper that it is handled as a separate entity in the design process.

In embodiments of the invention where the user interface gesture cavity rotates or slides around the display screen to provide an additional layer of input that is mapped onto the screen, the Android desktop UI supports two different modes; namely, closed and open. In closed mode the user interface gesture cavity surrounds the display screen to provide an additional layer of input that is mapped onto the screen. In open mode the cavity is separate from the screen. In open mode, the device receives multi-dimensional input from two separate subsystems; namely, from the screen and from the cavity. In closed mode, there is only one input; namely, touches the user performs on the screen. These touches are detected both by the screen and by the cavity.

Application Architectures

Various architectures for user interface (UI) representations are based upon similar concepts; namely, a graph of data objects representing a current structure of a UI, often referred to as a "model", which is rendered graphically on a screen in what is referred to as a "view". Nodes in a data object graph represent static and interactive UI objects, such as text, images, buttons and checkboxes. Different graphical representations of the same data object graph may exist simultaneously.

Various implements for a UI model are in use. For web browsers and for many word processors, the structure of a UI is a Document Object Model (DOM), for ANDROID™ the structure is a "view tree", and for FLASH® the structure is a "scene". The underlying concept is the same, regardless of hardware platform, operating system, runtime environment and programming language. Many platform vendors impose a preference for the UI model that is used. In an ANDROID™ environment, the programmer is recommended to use a set of XML files, called "application resources", to describe the UI model, and to use the JAVA® programming language, which is compiled into byte code for the DALVIK® runtime engine. However, developer requests led to the capability of using native C code for the programming language, through the Native Development Kit (NDK), and of using scripting languages, through the Scripting Layer SLA4 for ANDROID™.

Aspects of the present invention are applicable to any platform, model, programming environment and runtime environment. In accordance with an embodiment of the present invention, the UI data object graph is manipulated at runtime, based upon user events generated by a user input cavity.

The data object graph representing the UI is generally inflated from a textual representation. Inter alia, for web browsers, the inflated form may be an HTML document, for word browsers, the inflated form may be an OOXML document, and for SILVERLIGHT®, the inflated form may be an XAML document. In addition to being inflated from a document, the data object graph may be manipulated in response to events in a running application such as a web browser, a document editor and a desktop, such as in response to an event when a user uses a keyboard or pointer to interact with the UI.

Aspects of the present invention relate to manipulating the UI model. The user interface cavity interacts with the UI through a processing chain similar to other input devices, such as a touch screen, a mouse and a keyboard. Namely, a low level device driver captures raw events from the user input cavity and dispatches them via the operating system into the running application, which in turn interprets them and applies appropriate modifications to the UI model.

In accordance with an embodiment of the present invention, user interaction with the UI model includes inter alia the following actions.

Moving—In response to moving, the scope of the current view, i.e. the visible part of the UI model, is changed; e.g., scrolling in a document, and switching between different desktop screens in an ANDROID™ launcher.

Selection—In response to selecting, a specific object or group of objects is selected for further actions; e.g., selecting a file icon, and selecting a group of words in a text editor.

Manipulation—In response to manipulation, a previously selected object or group of objects is changed; e.g., rotating a selected image in a drawing program, and making selected text bold in a word processor.

Transfer—In response to transfer, a previously selected object or group of objects is moved to a new location within the UI model, or transferred to another model for another program, or transferred to another model at another device; e.g., dragging-and-dropping an object within a document, and moving a selected file to a new folder.

The user input cavity recreates input events that are used in a conventional PC environment, which normally are actuated by input methods that are not available for touch-based interfaces, including inter alia modifier keys (CTRL, ALT), additional mouse buttons and scroll wheels. It is not required to modify program code of target applications to support such events, since an intermediate device driver layer may translate user input cavity events to events that are familiar to the target application. Examples include inter alia zoom, cut & paste, scrolling and opening context menus. As such, third party applications can incorporate that user input cavity of the present invention without modification.

Moreover, the user input cavity of the present invention generates a variety of novel types of user input events including inter alia three-dimensional manipulation of objects, as described hereinbelow. To support such events, specific application code is required; i.e., existing applications require modification. The event handler of the application code listens for events from standard input devices, in parallel with the user input cavity, and manipulates the UI model in accordance with patterns that correspond to the new features.

Various options are available for writing new applications that use the novel input patterns provided by the user input cavity of the present invention. In an all JAVA® model, the full application is written in the JAVA® programming language and compiled to the DALVIK® framework. This is a conventional way of generating ANDROID™ applications, but it imposes two major drawbacks; namely, performance and flexibility.

An alternative model combines JAVA® and C. In this model, the program logic is written in JAVA® and the time-critical parts are written in C, exposed to the JAVA® layer via the JAVA® Native Interface (JNI). This enables performance improvements, and is a good way to start a project, as code can be ported from the JAVA® layer to the C layer on demand.

Yet another alternative model combines JAVA®, scripting and C. In this model too, the program logic is written in JAVA® and the time-critical parts are written in C, but the dynamic parts of the application are written in a scripting language hosted by the JAVA® layer, such as PYTHON®, Ruby or JAVASCRIPT®, and interpreted at runtime. This improves flexibility during development, as small changes may be made without recompiling and reinstalling the application.

A different model uses only scripting and C. This is an approach where the application appears as a native application with no JAVA™ layer, and the dynamic parts are handled by a scripting layer that communicates with the application through a remote procedure call (RPC). This is a complex, yet very flexible model, which is commonly used in gaming.

Figure 33:
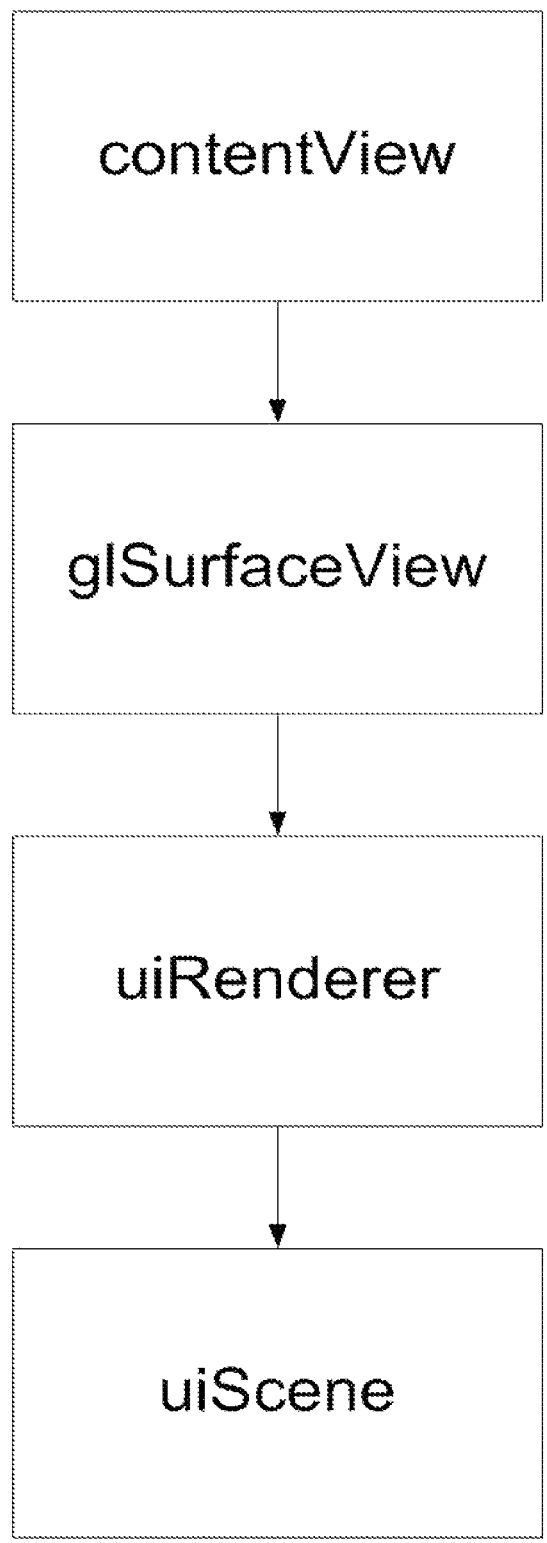
FIG. 33 is a simplified flow diagram illustrating how a launcher user interface is rendered, in accordance with an embodiment of the present invention.

The launcher UI is manifested as a scene graph modeled in 2D or 3D. There is no connection to the system of UI definitions as ANDROID™ resource files; everything is contained in a single view. Reference is made to FIG. 33, which is a simplified flow diagram illustrating how a launcher user interface is rendered, in accordance with an embodiment of the present invention. FIG. 33 shows how the launcher UI is handled within only one GLSurfaceView, which uses a renderer to render the full launcher UI scene.

Applications

The finger gesture user interface of the present invention is of widespread advantage in many different applications. Inter alia several of these applications are described in what follows.

In accordance with an embodiment of the present invention, the object inserted into the cavity is two fingers, and the user interface distinguishes between four mufti-finger gestures performed in said cavity; namely, (i) clockwise rotation, (ii) counter-clockwise rotation, (iii) finger pinch, and (iv) finger spread.

In accordance with an embodiment of the present invention, the display is a stereoscopic viewport, which renders a graphic being rotated in three dimensions in response to an object being inserted in the cavity.

In accordance with an embodiment of the present invention, the display pans an image or scrolls a document or a list in response to a one-finger gesture, and zooms an image, or rotates an object or opens a file in response to a two-finger gesture.

In accordance with an embodiment of the present invention, the display renders animated navigation of snapshots of widgets, documents, web page bookmarks, album artwork or photographs in response to a translation gesture; and renders opening of a widget, a document, a web page, an album or a photograph in response to a two-finger gesture.

In accordance with an embodiment of the present invention, the display renders fast animation of snapshots of widgets, documents, web page bookmarks, album artwork or photographs in response to a translation gesture; renders slow animation thereof in response to a first two-finger gesture; renders opening of a widget, document, web page, album or photograph in response to a second two-finger gesture; and renders closing thereof in response to a third two-finger gesture.

In accordance with an embodiment of the present invention, a cut and paste routine is provided. In this routine a user selects text or an object by touching the text or object on the display with one hand. The thumb and index finger of the other hand are then entered into the user input cavity frame, moved together in a pinch gesture and removed from the frame. This is the cut operation, figuratively grabbing the text or object. A target position for the cut object is marked by touching the display with one hand, then inserting the other hand with the thumb and index finger brought together into the user input frame, then bringing them apart in a spread gesture, which figuratively represents dropping the previously grabbed text or object into its new location.

In accordance with an embodiment of the present invention, an application program defines a context, and a function related to the context is activated in response to a finger gesture. For example, the display renders a menu of context-relevant options in response to tilting a finger inside a cavity at an acute angle.

In accordance with an embodiment of the present invention, the display renders an image, identifies a selected location within the image, and processes the selected location, in response to a finger gesture.

In accordance with an embodiment of the present invention, the display is a touch screen display, and the user interface detects finger gestures on the touch screen and also finger gestures in a cavity. The display pans an image in response to a finger gesture on the touch screen, and resizes the image in response to a finger gesture in the cavity. The finger gesture on the touch screen is inter alia a finger translation, and the finger gesture in the cavity is inter alia a finger pinch or a finger translation.

In accordance with an embodiment of the present invention, one or more objects are rendered, one of which is identified as being a selected object, and an application program processes the selected object, in response to a finger gesture performed in the user input cavity. For a first example, the selected object is selected text within a document, and the application program maintains the selected text at its location within the document and moves unselected text, thereby positioning the selected text at a different location within the document, in response to a finger gesture in the cavity. Moreover, the selected text is fixed at the different location in response to a second finger gesture in the cavity.

For a second example, the selected object is an icon, and the application program maintains the selected icon at its location on the display and moves unselected icons, thereby positioning the selected icon at a different location in the UI, in response to a finger gesture in the cavity. For example, in response to a user gesture in the cavity, inter alia a translation gesture, all unselected icons in the current Android screen are graphically swept off the display and icons from a different screen are graphically swept onto the display. This situates the selected icon on a different Android screen. Moreover, the icon text is fixed at the different location in response to a second finger gesture, inter alia removing the user's fingers from the cavity.

For a third example, the selected object is an entry in a contact list, and the application program initiates a phone call to the selected entry in response to a first finger gesture in the cavity, and opens an SMS dialog box addressed to the selected entry in response to a second finger gesture in the cavity.

For a fourth example, the selected object is a selected time interval within a calendar, and the application program causes the calendar to increase or decrease resolution to present a respectively greater or lesser time interval centered around the selected time interval.

For a fifth example, the selected object is a file, and the application is a file manager. The file manager presents properties of the selected file in response to an initial finger gesture in the cavity, and opens the selected file in response to an extension of the initial gesture. Moreover, the file system has multiple levels of folders, and the file manager presents properties of a selected file in response to an initial gesture in the cavity, displays the selected file as an icon in its folder in response to an extension of the initial gesture, and displays the folder as an icon in its next level folder in response to a further extension of the initial gesture.

For a sixth example, the selected object is a person within a social network, and the application program is a social network application. The application renders a first plurality of persons connected to the selected person in response to an initial gesture in the cavity, and renders a second plurality of persons connected to the first plurality of persons in response to an extension of the initial gesture.

For a seventh example, the selected object is a song or an artist in a music library, and the application program is a music library manager. The music library manager renders a first plurality of songs related to the selected song or artist in response to an initial finger gesture in the cavity, and renders a second plurality of songs connected to the first plurality of songs in response to an extension of the initial gesture.

For an eighth example, the selected object is a restaurant or hotel, and the application program is a reservation program for restaurants or hotels. The reservation program displays a plurality of restaurants or hotels similar to the selected restaurant or hotel in terms of style, cost, location or such other parameter(s), in response to an initial gesture in the cavity, and renders additional similar restaurants or hotels in response to an extension of the initial gesture.

Figure 34:
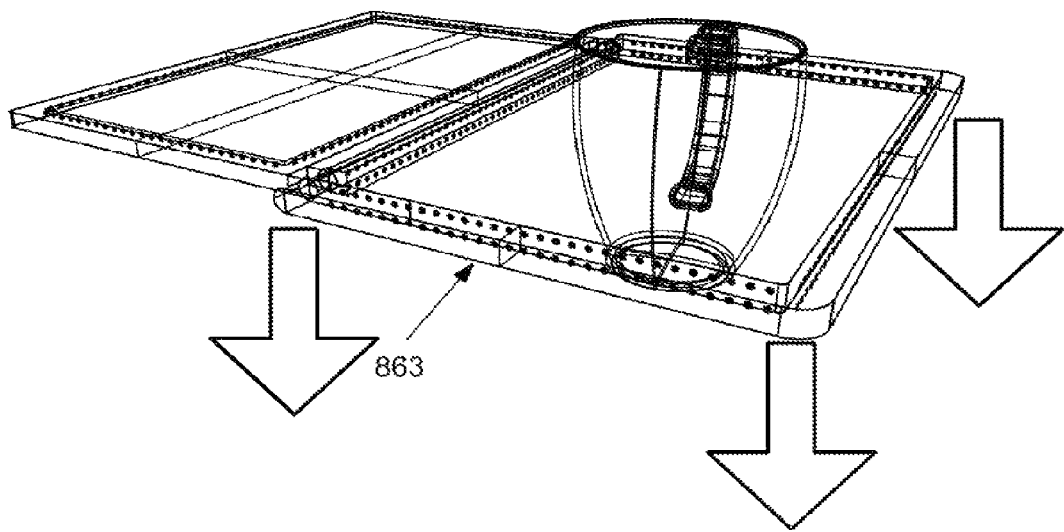
FIG. 34 is a simplified illustration of a device having a cavity that uses light-based detection scanning a 3D model of an object translated normal to the cavity plane, in accordance with an embodiment of the present invention.

Reference is made to FIG. 34, which is a simplified illustration of a three-dimensional modeling input system, in accordance with an embodiment of the present invention. The cavity within frame 863 is shown being lowered over a solid object, such as a coffee mug. This is indicated by the downward facing arrows. The series of detections executed by the frame as it is lowered are combined as 2-D slices of the object to provide a 3-D model of the solid object.

An alternative embodiment reduces the number of components in the system by coupling an emitter or a receiver to one end of a long thin light guide situated along an edge of the cavity. Such a light guide is described in U.S. Pat. No. 7,333, 095 to Lieberman et al., entitled ILLUMINATION FOR OPTICAL TOUCH PANEL.

Calibration of User Gesture Cavity Components

Calibration of emitters and detectors for object detection is described in Applicant's co-pending U.S. application Ser. No. 13/053,229, entitled "Touch Screen Calibration and Update Methods," filed on Mar. 22, 2011, Published as US Publ. No. 2011/0169781 A1 on Jul. 14, 2011.

ASIC Controller for Light-Based Touch Screens

Aspects of the present invention relate to design and use of a programmable state machine to control both the user gesture input cavity and a light based touch screen in a single device. The controller executes a scanning program on the series of emitters and detectors in both the touch screen and in the user gesture input cavity. The scanning program determines scan sequence, current levels and pulse widths. By configuring the scan sequence registers, the host processor determines which LED-PD pairs are activated. The controller thus sets activation for LED-PD pairs surrounding the screen, for LED-PD pairs in the user input gesture cavity, or for both. The host processor associates each LED and each PD with either the screen or the cavity and processes its results accordingly. For example, touches on the screen require greater precision than the user gestures in the input cavity. Therefore, detection results on the screen are filtered both temporally and spatially, whereas detection results in the input cavity are not filtered, or alternatively are filtered only spatially, optionally using a different set of filter coefficients. In addition, the scan sequence configuration registers enable configuring an oversampled activation sequence, inter alia activating each emitter with two detectors, and a one-to-one sequence, wherein each emitter is activated with only one detector. Typically, the emitters and detectors around the user input cavity are aligned opposite one another. In some embodiments of the present invention, at least two sets of scan configuration registers are provided to enable configuring two different scan patterns; namely, one set for emitters and receivers around the screen, and one set for emitters and detectors surrounding the user input cavity, to be executed in a single scan operation of the controller. In other embodiments scan sequences for the screen are configured and executed separately from scan sequences for the user input cavity.

The controller includes integrated LED drivers for LED current control, integrated receiver drivers for photo detector current measurement, and an integrated A/D convertor to enable communication between the controller and a host processor using a standard bus interface, such as a Serial Peripheral Interface (SPI).

In accordance with the present invention, a program is loaded onto the controller, e.g., over SPI. Thereafter, scanning execution runs independently from the host processor, optimizing overall system power consumption. When the scan data are ready, the controller issues an interrupt to the host processor via an INT pin.

Figure 35:
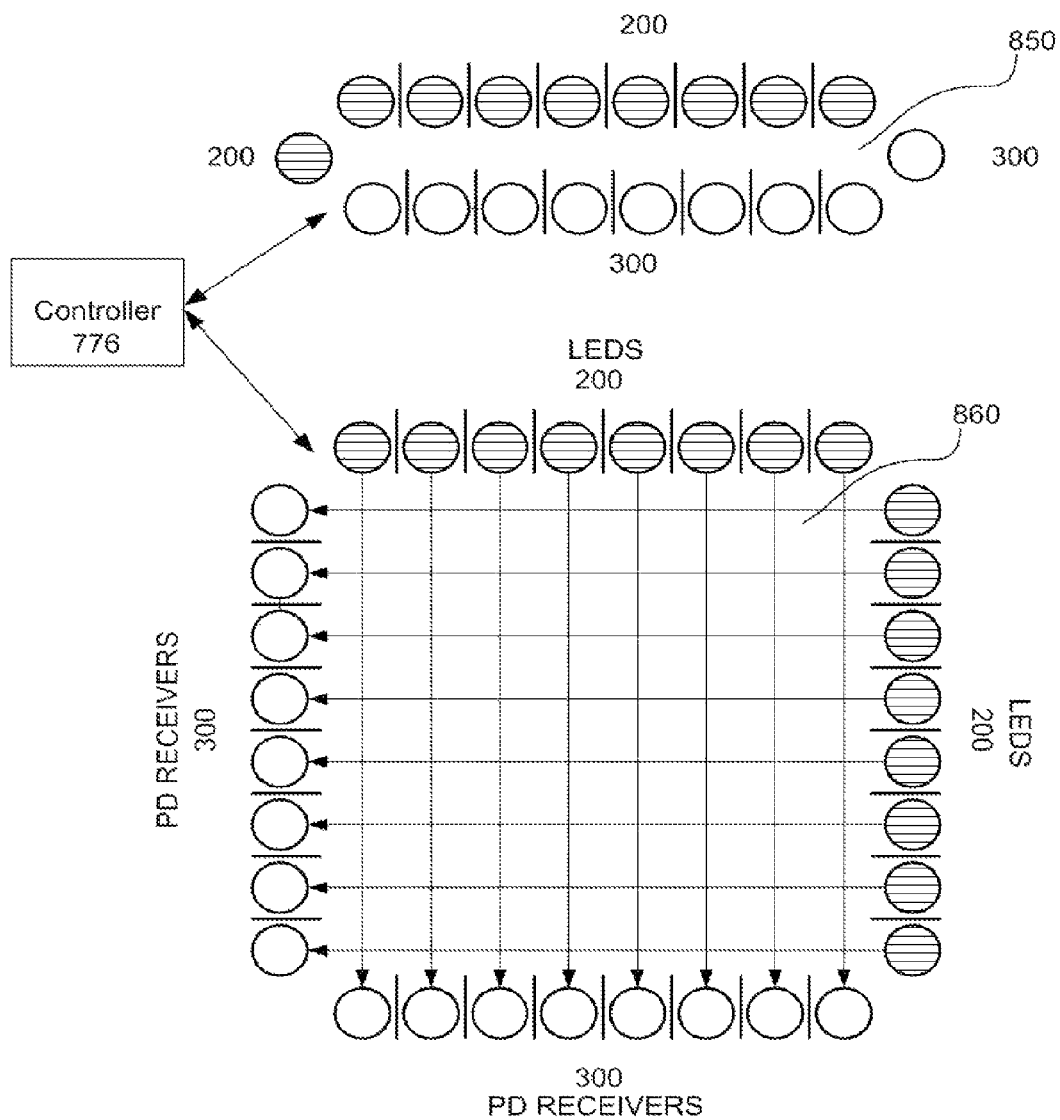
FIG. 35 is a simplified illustration of a single controller that executes scan sequences on a display and also on a cavity for finger gesture user input, in accordance with an embodiment of the present invention.

Reference is made to FIG. 35, which is a simplified block diagram of an ASIC controller 776 for a light-based touch screen 860 and user input cavity 850, in accordance with an embodiment of the present invention. Controller 776 activates emitters 200 and receivers 300 that surround touch screen 860 and cavity 850.

Figure 36:
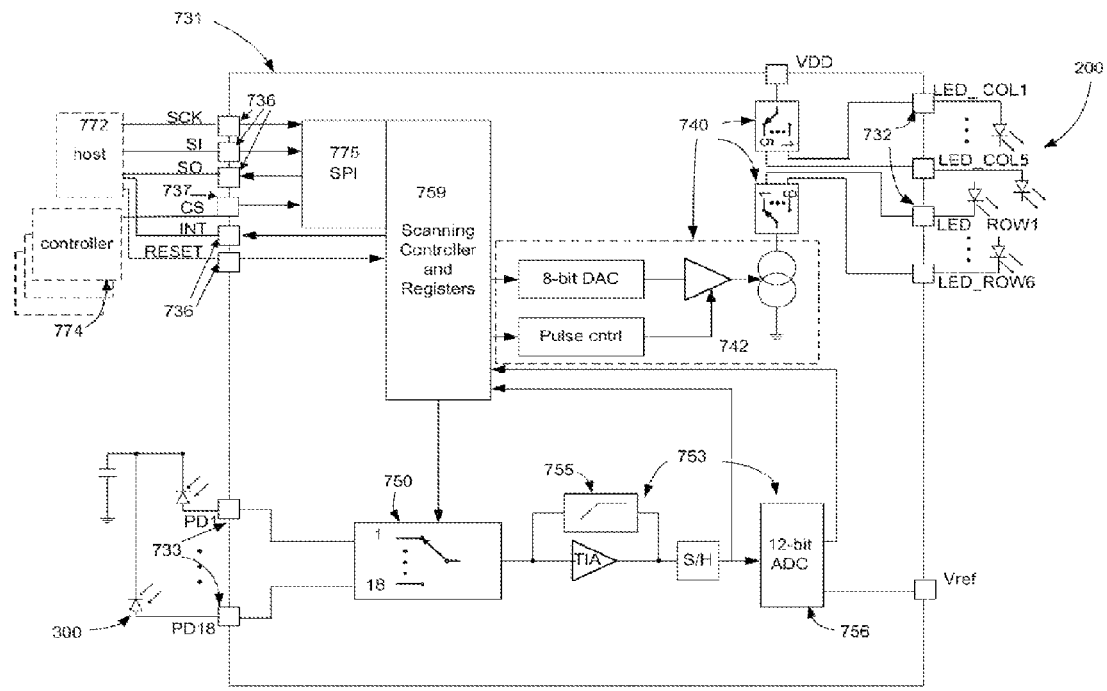
FIG. 36 is an exemplary circuit diagram of a chip package for a controller of a light-based user input cavity and touch screen, in accordance with an embodiment of the present invention.

Reference is made to FIG. 36, which is a circuit diagram of a chip package 731 for a controller of a light-based touch screen and user input cavity, in accordance with an embodiment of the present invention. As shown in FIG. 36, chip package 731 includes emitter driver circuitry 740 for selectively activating a plurality of photoemitters 200 that are outside of the chip package, and signal conducting pins 732 for connecting photoemitters 200 to emitter driver circuitry 740. Emitter driver circuitry 740 is described in applicants' co-pending patent application U.S. Ser. No. 12/371,609 entitled LIGHT-BASED TOUCH SCREEN filed on Feb. 15, 2009, the contents of which are hereby incorporated by reference. Inter alia, reference is made to paragraphs [0073], paragraphs [0087]-[0091] and FIG. 11 of this application as published in U.S. Publication No. 2009/0189878 A1 on Jul. 30, 2009.

Emitter driver circuitry 740 includes circuitry 742 for configuring individual photoemitter pulse durations and pulse currents for each emitter-detector pair via a programmable current source. Circuitry 742 is described in applicants' co-pending patent application U.S. Ser. No. 13/052,511 entitled LIGHT-BASED TOUCH SCREEN WITH SHIFT-ALIGNED EMITTER AND RECEIVER LENSES filed on Mar. 21, 2011, the contents of which are hereby incorporated by reference. Inter alia, reference is made to paragraphs [0343]-[0358] and FIGS. 99-101 of this application as published in U.S. Publication No. 2011/0163998 on Jul. 7, 2011.

Chip package 731 includes detector driver circuitry 750 for selectively activating a plurality of photo detectors 300 that are outside of the chip package, and signal conducting pins 733 for connecting photo detectors 300 to detector driver circuitry 750. Detector driver circuitry 750 includes circuitry 755 for filtering current received from photo detectors 300 by performing a continuous feedback bandpass filter, and circuitry 756 for digitizing the bandpass filtered current. Circuitry 755 is described inter alia at paragraphs [0076], paragraphs [107]-[0163] and FIGS. 14-23B of the above-reference U.S. Publication No. 2009/0189878 A1. Chip package 731 also includes detector signal processing circuitry 753 for generating detection signals representing measured amounts of light detected on photo detectors 300.

Chip package 731 further includes I/O pins 736 for communicating with a host processor 772, and conducting pins for connecting to a power source. Chip package 731 further includes controller circuitry 759 for controlling emitter driver circuitry 740 and detector driver circuitry 750. Controller circuitry 759 communicates with host processor 772 using a bus standard for a Serial Peripheral Interface (SPI) 775. Chip package 731 further includes a chip select (CS) pin 737 for coordinating operation of controller circuitry 759 with at least one additional controller 774 for the light-based touch screen.

The controller shown in FIG. 36 packages all of the above mentioned elements within chip package 731, (i) thereby enabling automatic execution of an entire scan sequence, such as 50 emitter-received pairs, and (ii) thereby storing the detection signals in a register array for subsequent analysis by host processor 772.

Figure 37:
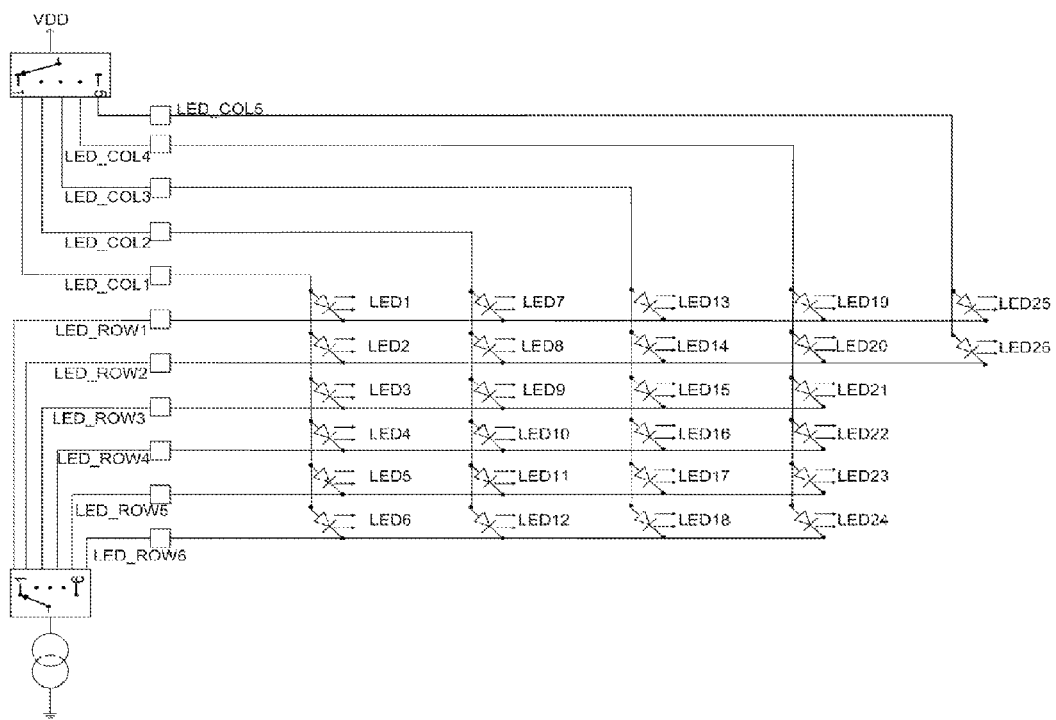
FIG. 37 is an exemplary circuit diagram for six rows of photo emitters with 4 or 5 photo emitters in each row, for connection to the chip package of FIG. 36, in accordance with an embodiment of the present invention.

Reference is made to FIG. 37, which is a circuit diagram for six rows of photo emitters with 4 or 5 photo emitters in each row, for connection to pins 732 of chip package 731, in accordance with an embodiment of the present invention. The 11 lines LED_ROW1, ..., LED_ROW6 and LED_COL1, ..., LED_COL5 provide two-dimensional addressing for 30 photo emitters, although a first portion the photo emitters are physically arranged around two edges of touch screen 860, and a second portion are physically arranged around input cavity 850, as shown in FIG. 35. TABLE III shows how LEDs are mapped to LED_ROW and LED_COL pins. More generally, an LED matrix may include an m×n array of LEDs supported by m+n I/O pins on the controller.

TABLE III

| LED multiplex mapping to LED_ROW and LED_COL pins | | |
|---|---|---|
| LED | LED_ROW pin enabled | LED_COL pin enabled |
| 1 | 1 | 1 |
| 2 | 2 | 1 |
| 3 | 3 | 1 |
| 4 | 4 | 1 |
| 5 | 5 | 1 |
| 6 | 6 | 1 |
| 7 | 1 | 2 |
| 8 | 2 | 2 |
| 9 | 3 | 2 |
| 10 | 4 | 2 |
| 11 | 5 | 2 |
| 12 | 6 | 2 |
| 13 | 1 | 3 |
| 14 | 2 | 3 |
| 15 | 3 | 3 |
| 16 | 4 | 3 |
| 17 | 5 | 3 |
| 18 | 6 | 3 |
| 19 | 1 | 4 |
| 20 | 2 | 4 |
| 21 | 3 | 4 |
| 22 | 4 | 4 |
| 23 | 5 | 4 |
| 24 | 6 | 4 |
| 25 | 1 | 5 |

TABLE III-continued

LED multiplex mapping to LED_ROW and LED_COL pins

| LED | LED_ROW pin enabled | LED_COL pin enabled |
|---|---|---|
| 26 | 2 | 5 |
| 27 | 3 | 5 |
| 28 | 4 | 5 |
| 29 | 5 | 5 |
| 30 | 6 | 5 |

As such, an LED is accessed by selection of a row and a column I/O pin. The controller includes push-pull drivers for selecting rows and columns. It will be appreciated by those skilled in the art that the row and column coordinates of the LEDs are unrelated to the physical placement of the LEDs and the push-pull drivers. In particular, the LEDs do not need to be physically positioned in a rectangular matrix.

In an alternative embodiment of the controller of the present invention, current source drivers are used instead of push-pull drivers. In another embodiment of the controller of the present invention, some of the push-pull drivers are combined with current source drivers, and others of the push-pull drivers are combined with current sink drivers.

When the controller of the present invention scans a series of emitter-receiver pairs, an LED driver supplies an amount of current to an LED in accordance with settings in LED current control registers and LED pulse length control registers. LEDs are selected for activation in accordance with settings in scan range registers. The scan range registers designate a first LED to be activated along each screen edge and along the cavity edge, the number of LEDs to be activated along each edge, and the step factor between activated LEDs. A step factor of 0 indicates that at each step the next LED is activated, and a step factor of 1 indicates that every other LED is activated. Thus, to activate only odd or only even LEDs, a step factor of 1 is used. Step factors of 2 or more may be used for steps of 2 or more LEDs, respectively. An additional register configures the number of PDs that are activated with each LED. A value of 0 indicates that each LED is activated with a single corresponding PD, and a value of 1 indicates that each LED is activated with two PDs. The number of PDs activated with each LED may be as many PD that are available around the touch screen. Typically, the controller will activate separate scan sequences for the screen elements and for the cavity elements. These activations are differentiated by the index of elements included in each sequence. For example, elements 1-20 are screen LEDs, and elements 21-30 are cavity LEDs.

The controller of the present invention automatically controls a mux to direct current to desired LEDs. The LED mux control is set by scanning control registers. The controller automatically synchronizes the correct PD receiver when the drivers pulse the LEDs. Twelve-bit ADC receiver information is stored in PD data registers. Upon completion of scanning, the controller issues an interrupt to the host processor, and automatically enters standby mode.

In some touch screen configurations, screen-related emitters are shift-aligned with receivers, with emitters being detected by more than one receiver and being activated one or more times for each detecting receiver. For example, an emitter may be activated three times in rapid succession, and with each activation a different receiver is activated. Moreover, a receiver is further activated during the interval between emitter activations to determine an ambient light intensity.

In other touch screen configurations, screen-related emitters and receivers are aligned, but each emitter is detected by more than one receiver, and each emitter is activated separately for each detecting receiver. Emitter-receiver activation patterns are described in applicants' co-pending patent application U.S. Ser. No. 12/667,692 entitled SCANNING OF A TOUCH SCREEN filed on Jan. 5, 2010, the contents of which are hereby incorporated by reference. Inter alia, reference is made to paragraphs [0029], [0030], [0033] and [0034] of this application as published in U.S. Publication No. 2011/0043485 on Feb. 24, 2011.

In accordance with an embodiment of the present invention, the controller is a simple state machine and does not include a processor core, such as an ARM core. As such, costs of controllers of the present invention are low. A light-based touch screen using a controller of the present invention costs less than a comparable capacitive touch screen, since a capacitive touch screen requires a processor core in order to integrate a large number of signals and calculate a touch location. In order to achieve a quick response time, a capacitive touch screen uses a dedicated processor core to calculate a touch location, instead of offloading this calculation to a host processor. In turn, this increases the bill of materials for capacitive touch screens. In distinction, light-based touch screens of the present invention use two neighboring receiver values to calculate a touch location along an axis, which enables the host to calculate a touch location and, consequently, enables use of a low-cost controller. In addition, devices according to the teachings of the present invention use resources efficiently by utilizing the same controller for both the touch screen and the user gesture cavity.

The present invention has broad application to electronic devices with touch sensitive screens, including small-size, mid-size and large-size screens. Such devices include inter alia computers, home entertainment systems, car entertainment systems, security systems, PDAs, cell phones, electronic games and toys, digital photo frames, digital musical instruments, e-book readers, TVs and GPS navigators.

In the foregoing specification, the invention has been described with reference to specific exemplary embodiments thereof. It will, however, be evident that various modifications and changes may be made to the specific exemplary embodiments without departing from the broader spirit and scope of the invention as set forth in the appended claims. Accordingly, the specification and drawings are to be regarded in an illustrative rather than a restrictive sense.

What is claimed is:

1. A finger gesture user interface for an electronic device, comprising:
   a housing for an electronic device comprising:
      a front opening in a front outer surface of the housing;
      a rear opening in a rear outer surface of the housing; and
      inner sidewalls extending from said front opening to said rear opening to form a cavity;
   a display, mounted in said housing along a plane transverse to said front and rear openings, for rendering a three-dimensional (3D) realm;
   a detector mounted in said inner sidewalls, operable to detect translation of a finger inserted in the cavity along a dimension of the cavity transverse to the display plane; and
   a processor connected to said detector and to said display for interpreting the detected finger translation as a user interface input command to move within the 3D realm along the dimension transverse to the display.

2. The user interface of claim 1, wherein said housing comprises first and second sections connected by a hinge that enables folding the two sections onto each other, wherein said display is mounted in said first section and the cavity is located in said second section within a frame that fits around the edges of said first section when the sections are folded, and wherein said display is oriented along the plane transverse to said front and rear openings when the sections are unfolded.

3. The user interface of claim 1, wherein said detector is further operable to detect at least-five location and orientation attributes in response to the finger being inserted inside the cavity; namely, (i) location along an x-axis;
    (ii) location along a y-axis;
    (iii) location along a z-axis;
    (iv) polar angle in the xz-plane; and
    (v) polar angle in the yz-plane, wherein the locations and polar angles are with reference to x and y axes along the length and width of the front opening of the cavity and to a z axis along the height of the cavity from front to rear.

4. The user interface of claim 1, wherein said detector is further operable to detect a multi-finger spread gesture and a multi-finger pinch gesture inside the cavity.

5. The user interface of claim 4, wherein said processor interprets the detected multi-finger spread gesture as a user interface input command to open a widget, document, web page, album or photograph.

6. The user interface of claim 4, wherein said processor interprets the detected multi-finger pinch gesture as a user interface input command to close an open widget, document, web page, album or photograph.

7. The user interface of claim 1, wherein said detector is further operable to detect a speed of insertion of the finger along the height of the cavity from front to rear, and wherein an attribute of the user interface input command is configured according to the speed.

8. The user interface of claim 1, wherein said detector is further operable to detect two polar angles of the finger inside the cavity with reference to x and y axes along the length and width of the front opening of the cavity and to a z axis along the height of the cavity from front to rear, namely, (i) polar angle in the xz-plane; and
    (ii) polar angle in the yz-plane, and wherein said processor interprets changes in the polar angles as user interface input commands.

9. The user interface of claim 8, wherein a gesture comprising tilting the finger inside the cavity causes said display to render a pop-up menu.

10. The user interface of claim 1, wherein said detector is further operable to detect a multi-finger rotation gesture inside the cavity.

11. The user interface of claim 10, wherein said processor causes said display to render a rotation of a displayed image, in response to said detector detecting the multi-finger rotation gesture.

* * * * *